United States Patent
Shveidel et al.

(10) Patent No.: US 11,853,592 B2
(45) Date of Patent: Dec. 26, 2023

(54) REVERSIBLE WRITE TECHNIQUES USING PHYSICAL STORAGE DEVICE OFFLOADING

(71) Applicant: Dell Products L.P., Hopkinton, MA (US)

(72) Inventors: Vladimir Shveidel, Pardes-Hana (IL); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 72 days.

(21) Appl. No.: 17/715,538

(22) Filed: Apr. 7, 2022

(65) Prior Publication Data
US 2023/0325106 A1    Oct. 12, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0638* (2013.01); *G06F 3/0679* (2013.01)

(58) Field of Classification Search
CPC .... G06F 3/0655; G06F 3/0604; G06F 3/0638; G06F 3/0678
See application file for complete search history.

(56) References Cited

U.S. PATENT DOCUMENTS

2015/0039577 A1* 2/2015 Talagala ................ G06F 3/0638
 707/703
2022/0019366 A1* 1/2022 Freilich ............... G06F 21/6218

OTHER PUBLICATIONS

U.S. Appl. No. 16/260,660, filed Jan. 29, 2019, entitled System and Method for Aggregating Metadata Changes in a Storage System, to Vladimir Shveidel, et al.

* cited by examiner

*Primary Examiner* — Jane W Benner
(74) *Attorney, Agent, or Firm* — Muirhead and Saturnelli, LLC

(57) ABSTRACT

A system can use non-volatile solid state drives (SSDs) to provide storage. The SSDs can implement internal log structured systems (LSSs). A reversible write operation can be serviced by an SSD to write first data to an SSD logical address. The reversible write operation can update the SSD logical address to store the first data rather than old data stored at the SSD logical address prior to servicing the reversible write operation. The old data can be stored at an SSD physical address and mapping information indicates the SSD logical address is mapped to the SSD physical address. Servicing the reversible write operation can include: retaining the mapping information and the old data; and adding second mapping information that maps the SSD logical address to a second SSD physical address storing the first data. A subsequent read operation can read the old data using the retained mapping information.

20 Claims, 14 Drawing Sheets

US 11,853,592 B2

REVERSIBLE WRITE TECHNIQUES USING PHYSICAL STORAGE DEVICE OFFLOADING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system, a device and a non-transitory computer readable medium. A first reversible write operation can be received at a physical storage device where the first reversible write operation writes first data to a first logical address on the physical storage device. Responsive to receiving the first reversible write operation, the physical storage device can service the first reversible write operation. The first reversible write operation updates first prior content, which is stored at the first logical address prior to servicing the first reversible write operation, to the first data written by the first reversible write operation. The first prior content is stored at a first physical address of the physical storage device, and wherein first mapping information of the physical storage device indicates that the first logical address is mapped to the first physical address. Servicing the first reversible write operation includes: retaining the first mapping information and the first prior content stored at the first physical address; storing the first data at a second physical address of the physical storage device; and adding second mapping information of the physical storage device to indicate that the first logical address is mapped to the second physical address of the physical storage device. A read operation can be received at the physical storage device. The read operation can be a request to read the first prior content which is updated by said first reversible write operation and which is stored at the first logical address prior to said servicing the first reversible write operation. Responsive to receiving the read operation, the physical storage device can service the read operation, wherein servicing the read operation includes: the physical storage device using the first mapping information, that maps the first logical address to the first physical address, to read the first prior content from the first physical address of the physical storage device; and returning the first prior content.

In at least one embodiment, a system can be configured for communication with the physical storage device. The system can issue the first reversible write operation and receive the first prior content. Processing can include, responsive to the system receiving the first prior content of the first logical address, the system issuing a second write operation to the physical storage device, wherein the second write operation writes the first prior content to the first logical address. The second write operation can be received by the physical storage device, and processing can include the physical storage device servicing the second write operation to update the first logical address to store the first prior content. Servicing the second write operation by the physical storage device can include: storing the first prior content at a third physical address of the physical storage device; and adding third mapping information of the physical storage device to indicate that the first logical address is mapped to the third physical address of the physical storage device.

In at least one embodiment, the physical storage device can retain the first mapping information and the first prior content stored at the first physical address in accordance with a retention policy. The first mapping information can denote that the first prior content is stored at the first logical address at a point in time prior to servicing the first reversible write operation. The retention policy can indicate that the physical storage device retains prior content for N logical addresses of the physical storage device that are updated using reversible write operations. The physical storage device can maintain mapping information for the N logical addresses, wherein, for each of the N logical addresses, the mapping information can map each logical address to a corresponding physical address including the prior content stored at each logical address prior to issuing a corresponding reversible write operation that updates each logical address. The N logical addresses can denote the N most recently updated logical addresses each updated using a reversible write operation which preserves the prior content of said each logical address in accordance with the retention policy.

In at least one embodiment, the system can be a data storage system which issues the first reversible write operation, the read operation, and the second write operation to the physical storage device. Processing can include performing transactional update processing by first code of the data storage system. A first transaction can include atomically updating a plurality of logical addresses of the physical storage device, and wherein the transactional update processing can include: issuing, from the data storage system to the physical storage device, a plurality of reversible write operations that update the plurality of logical addresses of the physical storage device; and the physical storage device servicing the plurality of reversible write operations that update the plurality of logical addresses of the physical storage device, wherein said servicing the plurality of reversible write operations further includes performing, for each of the plurality of reversible write operations that updates one of the plurality of logical addresses to updated content processing comprising: the physical storage device retaining existing content of said one logical address and associated mapping information that maps said one logical address to a corresponding physical address of the physical storage device that stores the existing content; the physical storage device storing the updated content written by said each reversible write operation at an associated physical address of the physical storage device; and the physical storage device updating current mapping information that maps said one logical address to the associated physical address.

In at least one embodiment, a failure can occur prior to completing the servicing the plurality of reversible write operations, and wherein the failure can trigger rollback processing of the transactional update processing. The rollback processing can include: the data storage system issuing a second read operation to the physical storage device that reads the existing content of an associated one of the plurality of logical addresses using the associated mapping information that is retained and maps said associated one logical address to the existing content stored at the corresponding physical address of the physical storage device; and the data storage system issuing another write operation to the physical storage device that writes the existing content to the associated one logical address to thereby update content stored at the associated one logical address, wherein writing the existing content to the associated one logical address includes storing the existing content at a new physical address of the physical storage device and updating the current mapping information that maps the associated one of the plurality of logical addresses to the new physical address.

In at least one embodiment, the retention policy can indicate that the physical storage device retains, for a specified amount of time, prior content of logical addresses of the physical storage device that are updated using reversible write operations.

In at least one embodiment, the retention policy can indicate that the storage device retains prior content of logical addresses of the physical storage device that are updated using reversible write operations until explicitly reclaimed. Associated prior content of a specified one of the logical addresses of the physical storage device updated using a reversible write operation can be reclaimed responsive to the physical storage device receiving a command that reclaims the associated prior content of the specified one logical address of the physical storage device. Processing can include: receiving the command that reclaims the associated prior content of the specified one logical address of the physical storage device; and responsive to receiving the command, the physical storage device reclaiming the associated prior content of the specified one logical address of the physical storage device, said reclaiming including reclaiming physical storage storing the associated prior content and reclaiming physical storage of retained mapping information that maps the specified one logical address to the reclaimed physical storage storing the associated prior content.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
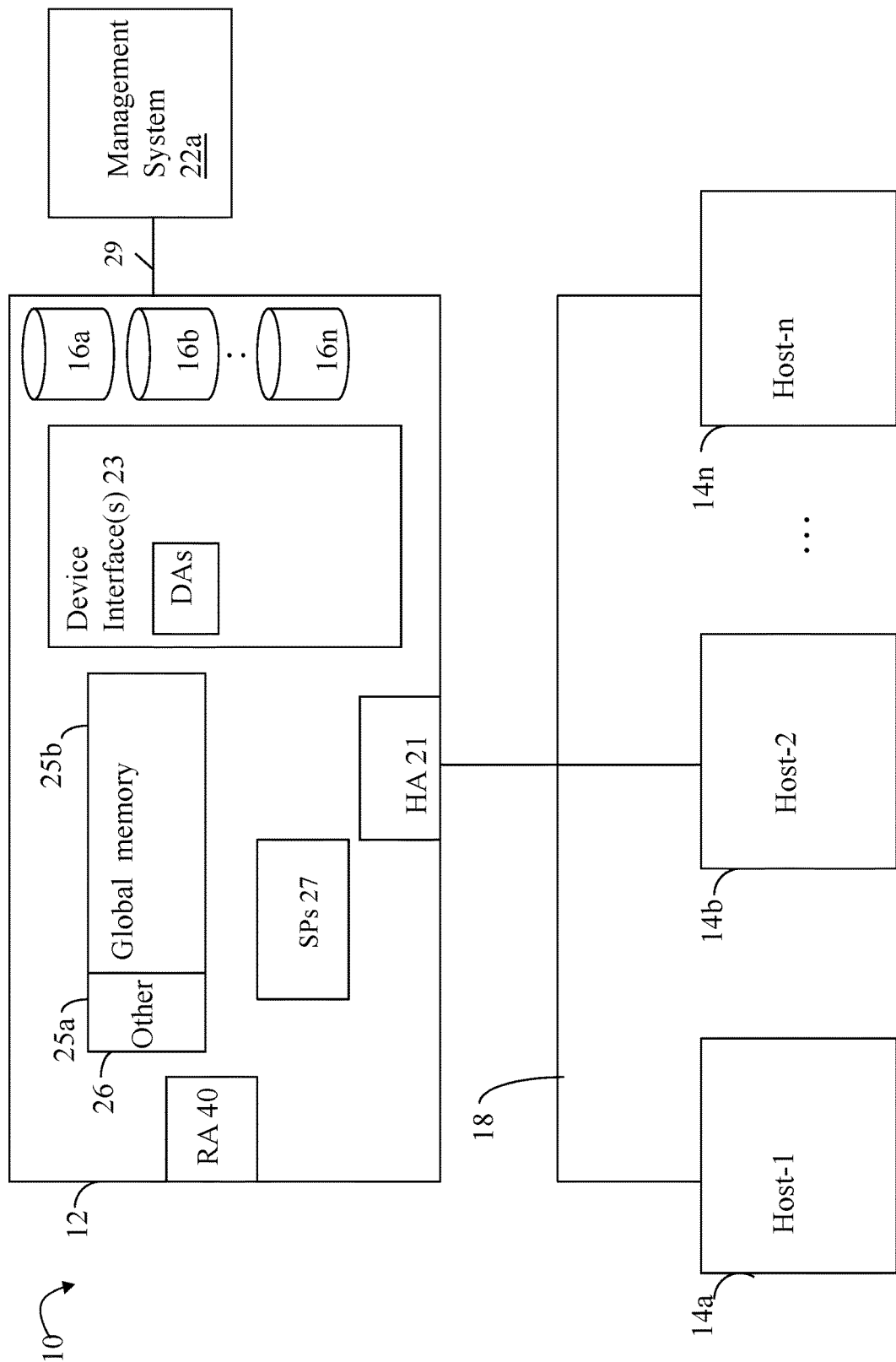
FIG. 1 is an example of components included in a system in accordance with the techniques of the present disclosure.

Generally, log structured stores or systems (LSSs) can be characterized by allowing newly written data to be stored at free or unused space on a data storage device, and by performing garbage collection that allows holes of storage including unused or invalid data to be compacted and reused. In an LSS, a logical address can mapped to a first storage location including current content of the logical address. Subsequently, newly written data to the logical address can be stored at a next available second storage location such that the newly written data does not physically overwrite the same first storage location including the current content. Rather, the newly written data can be stored in the second storage location that is different from the first storage location, and mapping information can be updated to map the logical address to the second storage location including the updated newly written data. As newly written data provides updated values for existing data stored at the logical address, the storage containing the existing or old data can be invalidated and freed for reuse.

Modern data storage systems can utilize backend non-volatile storage which includes one or more solid state storage devices or SSDs such as flash-based storage devices. The SSDs, such as flash memory storage devices, can employ an internal LSS since the SSDs do not support performing an in-place data update to a physical storage location. The LSS employed by an SSD can perform a device-level layer of mapping from SSD logical addresses to SSD physical addresses.

Thus, the LSS employed at the SSD device level internally within the LSS can have its own SSD internal components, for example, to maintain its own log, perform its own logical to physical address translation or mapping using its own metadata, to perform garbage collection, to perform storage management controlling data placement, to perform metadata management, and the like.

As noted above, a non-volatile SSD, such as flash-based storage, can implement an internal LSS with respect to its physical storage. Internal garbage collection can be performed within the SSDs to reuse free or invalidated physical storage as new data is written. Due to the nature of flash memory's operation, data cannot be directly overwritten to the same physical storage location as it can in a rotating disk drive such as a non-SSD hard disk drive. In at least one embodiment implementing flash-based SSDs, when data is first written to an SSD, the cells all start in an erased state so data can be written directly using pages at a time (often 4-8 kilobytes (KB) in size). In at least one embodiment, the SSD controller on the SSD, which manages the flash memory and interfaces with the data storage system, can use an SSD-internal logical to physical mapping system or layer similar to the mapping information. The data stored on the SSD can be assigned an SSD-based logical address that is mapped by the SSD's internal mapping information, or more generally metadata, to a corresponding physical storage location on the SSD. When new data comes in replacing older data already written, the SSD controller can write the new data in a new physical location and update the SSD's internal logical mapping information to point to the new physical location. The data in the old physical location is no longer valid, and will need to be erased before the old physical location can be written again. Subsequently after erasing the old physical location, the old physical location can be collected, such as by the SSD-internal garbage collection, and reused for storing newly written data.

A system, such as a data storage system, can employ offload processing where a workload typically done by a CPU of the system can be offloaded, for example, to another hardware component. In some instances, the hardware component can be a dedicated hardware component that performs only a particular process or operation. For example, compression is one operation that can be offloaded from a main CPU of a system, such as from the CPU of a data storage system and alternatively performed by a dedicated hardware component that only performs compression and/or decompression. For example, a system can send an uncompressed form of an input to the hardware component which performs compression processing on the input and then returns a compressed form of the input to the system. In this manner, the workload associated with compression processing can be characterized as offloaded from the system's main CPU to the hardware component. In a similar manner, other types of operations and processing can generally be offloaded from the CPU of a system, such as a data storage system, to another component or processor.

In at least one embodiment in accordance with the techniques of the present disclosure, a physical storage device or drive, such as an SSD, can provide functionality to offload processing from a data storage system. In at least one embodiment, the data storage system can include multiple physical storage devices, such as SSDs providing backend non-volatile storage, that provide such functionality to offload processing operations from one or more CPUs of the data storage system. The physical storage devices can include one or more components including, for example, one or more processors, associated memory and/or storage and executable code, to perform a desired offload processing operation. Thus, in at least one such an embodiment, the physical storage device can include internal logic and associated components which implement the desired offload processing operation and functionality.

Computational storage is a more general term that can be used to refer to the storage device, the computational storage device (CSD), that performs the offload processing. Computational storage can be defined as architectures that provide offloaded computational storage functions (CSF) coupled to the storage thereby offloading processing from another system, such as a data storage system. Computational storage architectures enable improvements in application performance and/or infrastructure efficiency through the integration of compute resources, for example, directly with the storage device. Thus, use of computational storage, such as physical storage devices performing offload processing, in a data storage system can result in improved data storage system performance by offloading one or more desired operations and associated processing from the data storage system to the physical storage devices to reduce and/or alleviate constraints on resources (e.g., compute or processor, and/or memory) of the data storage system.

In at least one embodiment, the physical storage device can be an SSD providing non-volatile storage. The SSD can include one or more components and logic that perform offload processing. In at least one embodiment in accordance with the techniques of the present disclosure, the offload processing performed by the SSD can provide support for a reversible write utilizing an LSS implemented internally in the SSD. In such an embodiment, a data storage system including the SSD can utilize such offloaded functionality of the SSD using its internal LSS to perform a reversible write used in implementing, for example, transactional update logic without the overhead of the data storage system performing transactional recording or logging, for example, of the old data or content as prior to the update. Rather in at least one embodiment, prior or old content of an SSD logical address can be retained internally by the SSD as a result of issuing a reversible write command to the SSD logical address, where the reversible write updates the SSD logical address to store new data, and where, as may be needed, the prior or old content of the SSD logical address can be subsequently read from the SSD by an external SSD client.

Transactional logic implemented to perform a transactional update can include updating multiple objects as part of the same transaction whereby either all the multiple objects are updated to their respective new values, or none of the multiple objects are updated (where all multiple objects retain their respective old content as prior to the transaction). Transactional logic generally means that either all objects of the transaction are updated atomically to reflect the new or updated values, or none of the objects are updated by the transaction to reflect their new values for data consistency at the transaction level. A system such as a data storage system can implement transactional logic to ensure transaction level consistency among the multiple objects updated by the same transaction. Thus, in the case of a failure to successfully update all objects of the transaction, a transaction rollback mechanism or logic can be used to restore all the objects to their respective old content or values as prior to the occurrence of the transaction. Generally, if a failure occurs when attempting to commit or complete a transaction of multiple objects, a system can implement either the transaction rollback logic so that all objects have their old content as prior to the transaction, or otherwise implement a transaction roll forward logic so that all objects of the transaction have their updated or new content. However, a transactionally consistent state does not allow for a partial transaction update so that one or more of the objects of the transaction have their old content as prior to the transaction while one or more other objects have their updated content. Transactional logic can ensure that the affected objects have content reflecting a transactionally consistent state with respect to content exposed to clients so that such clients have an exposed data view where all objects either have their old content or all objects have their updated content.

In implementing the transaction rollback of the transactional logic using the techniques of the present disclosure in at least one embodiment, the old prior data or content stored at an SSD logical address can be retained and stored internally within the internal LSS of the SSD even though the old data or content stored at the SSD logical address is overwritten. The old data stored at the SSD logical address can be retained internally by the SSD in accordance with a defined retention policy. Additionally, the old data stored at the SSD logical address can be exposed and made available to SSD-external code, such as code executing on the data storage system, where such SSD-external code implements the transactional logic. In this manner, the SSD-external code can implement the transactional logic, such as for a transaction rollback, using the old data or content of the SSD logical address maintained internally by the SSD. In such an embodiment, the data storage system does not have to have its own SSD-external code perform processing to record or log the old content or values that can be needed in connection with implementing the transaction rollback, or more generally, the transactional logic. Rather, as may be needed, the SSD-external code can access and restore old prior data or content of a logical address, where the old prior data or content can be retained internally by the SSD and made accessible to the SSD-external code or client. In at least one embodiment, the SSD-external code can access, such as be reading, the old prior data or content of the SSD logical address and then issue a write command that updates or rewrites the old prior data to the SSD logical address.

In at least one embodiment, the SSD can internally implement the LSS where data is written to a logical address, offset or location on the SSD. The SSD logical address can then be mapped internally by the LSS of the SSD to an underlying physical address of the SSD, where content or data is stored at the SSD physical address. With the LSS of the SSD, a data update written to a logical address, offset or location on the SSD does not overwrite or perform an in-place update of the originally mapped first SSD physical address. Rather, the update or overwrite, which is a second write to the SSD logical address, can result in updating the mapping of the SSD logical address to a second SSD physical address which is different than the originally mapped first SSD physical address. Thus, the old data or content (of the SSD logical address) stored at the first SSD physical address is not physically overwritten with the new or updated data of the second write. The operation of the LSS of the SSD provides for retaining the old data stored at the first SSD physical address for some time, for example, until garbage collection or other reclamation processing is performed to reclaim the unused storage containing the old data. In at least one embodiment in accordance with the techniques of the present disclosure, the original or first mapping of the SSD logical address to the first SSD physical address, along with the old data or content stored at the first SSD physical address, can be retained in accordance with a defined retention policy. Thus, the defined retention policy can guarantee that the original or first mapping of the SSD logical address to the first SSD physical address, along with the old data or content stored at the SSD logical address, are available or preserved internally on the SSD after the second write or overwrite of the SSD logical address for some subsequent amount of time based on one or more conditions of the retention policy. Additionally, in at least one embodiment, the old data or content can be externally exposed outside of the SSD, such as through a command or API (application programming interface) of the SSD, to external code that is external to the SSD. In such an embodiment, code of the data storage system can use the command or API to access and read the old data or content of the SSD logical address which has been overwritten with new or updated content. The old content or data of the SSD logical address can be available and accessible to the external code for an amount of time and/or in accordance with other conditions specified in the defined retention policy. In such an embodiment where the old data or content may be needed such as for transactional rollback processing, the data storage system can omit additional processing which explicitly logs or stores the old data of the SSD logical address prior to overwriting or updating the SSD logical address with new data.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
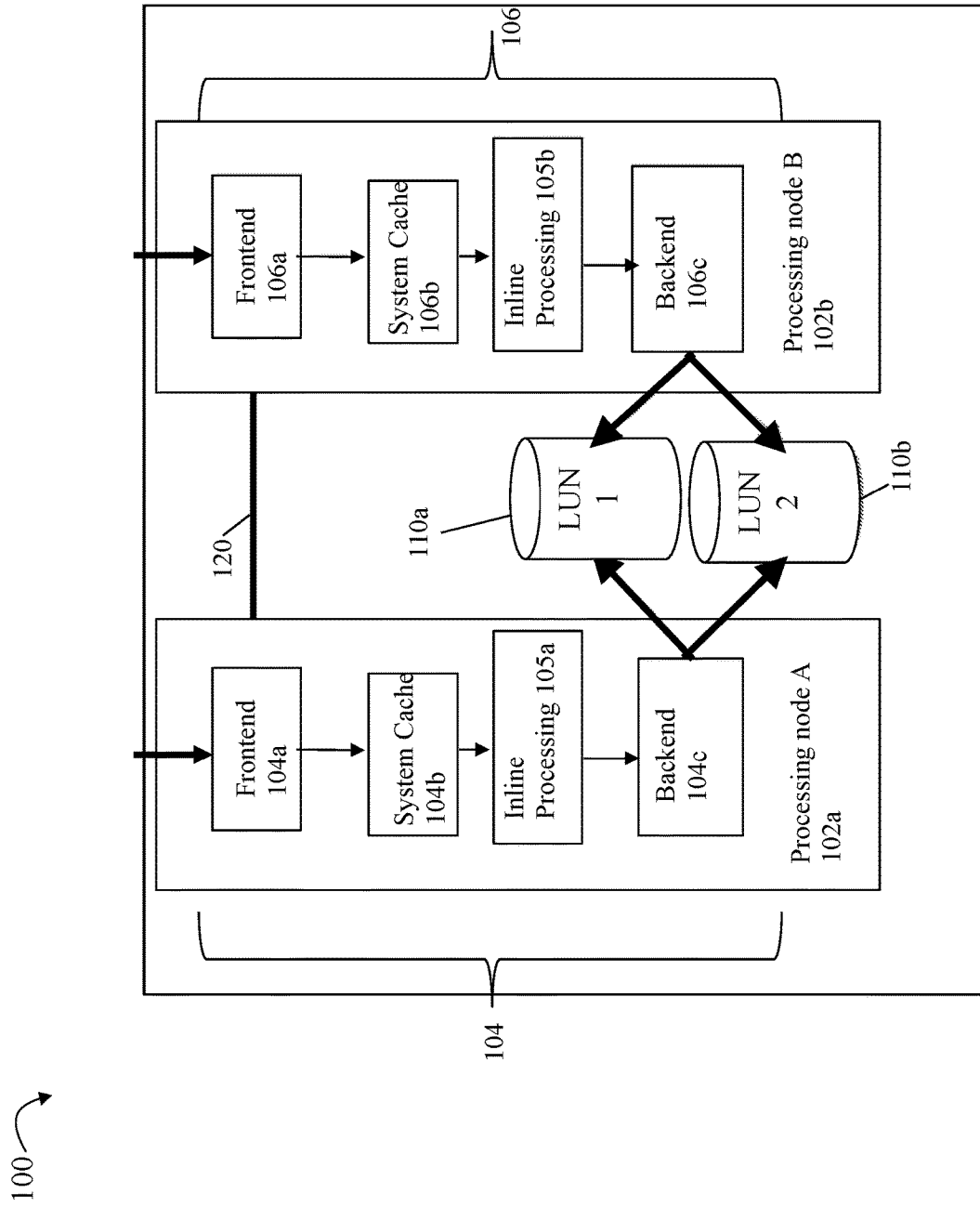
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102*a*-*b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with discussion above, an LSS can be characterized by allowing newly written data to be stored at free or unused space on a data storage device, and by performing garbage collection that allows holes of storage including unused or invalid data to be compacted and reused. In an LSS, a logical address can mapped to a first storage location including current content of the logical address. Subsequently, newly written data to the logical address can be stored at a next available second storage location such that the newly written data does not physically overwrite the same first storage location including the current content. Rather, the newly written data is stored in the second storage location that is different from the first storage location, and mapping information can be updated to map the logical address to the second storage location including the updated newly written data. As newly written data provides updated values for existing data stored at the logical address, the storage containing the existing or old data can be invalidated and freed for reuse.

Modern data storage systems can utilize backend non-volatile storage which includes one or more solid state storage devices or SSDs such as flash-based storage devices. The SSDs, such as flash memory storage devices, can employ an internal LSS since the SSDs do not support performing an in-place data update to a physical storage location. The LSS employed by an SSD can perform a device-level layer of mapping from logical to physical addresses.

Thus, the LSS employed at the SSD device level internally within the LSS can have its own SSD internal components, for example, to maintain its own log, perform its own logical to physical address translation or mapping using its own metadata, to perform garbage collection, to perform storage management controlling data placement, to perform metadata management, and the like.

As noted above, a non-volatile SSD, such as flash-based storage, can implement an internal LSS with respect to its physical storage. Internal garbage collection can be performed within the SSDs to reuse free or invalidated physical storage as new data is written. Due to the nature of flash memory's operation, data cannot be directly overwritten to the same physical storage location as it can in a rotating disk drive such as a non-SSD hard disk drive. In at least one embodiment implementing flash-based SSDs, when data is first written to an SSD, the cells all start in an erased state so data can be written directly using pages at a time (often 4-8 kilobytes (KB) in size). In at least one embodiment, the SSD controller on the SSD, which manages the flash memory and interfaces with the data storage system, can use an SSD-internal logical to physical mapping system or layer similar to the mapping information. The data stored on the SSD can be assigned an SSD-based logical address that is mapped by the SSD's internal mapping information, or more generally metadata, to a corresponding physical storage location on the SSD. When new data comes in replacing older data already written, the SSD controller can write the new data in a new physical location and update the SSD's internal logical mapping information to point to the new physical location. The data in the old physical location is no longer valid, and will need to be erased before the old physical location can be written again. Subsequently after erasing the old physical location, the old physical location can be collected, such as by the SSD-internal garbage collection, and reused for storing newly written data.

A system, such as a data storage system, can employ offload processing where a workload typically done by a CPU of the system can be offloaded, for example, to another hardware component. In some instances, the hardware component can be a dedicated hardware component that performs only a particular process or operation. For example, compression is one operation that can be offloaded from a main CPU of a system, such as from the CPU of a data storage system and alternatively performed by a dedicated hardware component that only performs compression and/or decompression. For example, a system can send an uncompressed form of an input to the hardware component which performs compression processing on the input and then returns a compressed form of the input to the system. In this manner, the workload associated with compression processing can be characterized as offloaded from the system's main CPU to the hardware component. In a similar manner, other types of operations and processing can generally be offloaded from the CPU of a system, such as a data storage system, to another component or processor.

In at least one embodiment in accordance with the techniques of the present disclosure, a physical storage device or drive, such as an SSD, can provide functionality to offload processing from a data storage system. In at least one embodiment, the data storage system can include multiple physical storage devices, such as SSDs, that provide such functionality to offload processing operations from one or more CPUs of the data storage system. The physical storage devices can include one or more components including, for example, one or more processors, associated memory and/or storage and executable code, to perform a desired offload processing operation. Thus, in at least one such an embodiment, the physical storage device can include internal logic and associated components which implement the desired offload processing operation and functionality.

Computational storage is a more general term that can be used to refer to the storage device, the CSD that performs the offload processing. Computational storage can be defined as architectures that provide offloaded CSFs coupled to the storage thereby offloading processing from another system, such as a data storage system. Computational storage architectures enable improvements in application performance and/or infrastructure efficiency through the integration of compute resources, for example, directly with the storage device. Thus, use of computational storage, such as physical storage devices performing offload processing, in a data storage system can result in improved data storage system performance by offloading one or more desired operations and associated processing from the data storage system to the physical storage devices to reduce and/or alleviate constraints on resources (e.g., compute or processor, and/or memory) of the data storage system.

In at least one embodiment, the physical storage device can be an SSD providing non-volatile storage. The SSD can include one or more components and logic that perform offload processing. In at least one embodiment in accordance with the techniques of the present disclosure, the offload processing performed by the SSD can provide support for a reversible write utilizing an LSS implemented internally in the SSD. In such an embodiment, a data storage system including the SSD can utilize such offloaded functionality of the SSD using its internal LSS to perform a reversible write to implement transactional update logic without the overhead of the data storage system performing transactional recording or logging, for example, of the old data or content as prior to the update.

Transactional logic implemented to perform a transactional update can include updating multiple objects as part of the same transaction whereby either all the multiple objects are updated to their respective new values, or none of the multiple objects are updated (where all multiple objects retain their respective old content as prior to the transaction). Transactional logic generally means that either all objects of the transaction are updated atomically to reflect the new or updated values, or none of the objects are updated by the transaction to reflect their new values for data consistency at the transaction level. A system such as a data storage system can implement transactional logic to ensure transaction level consistency among the multiple objects updated by the same transaction. Thus, in the case of a failure to successfully update all objects of the transaction, a transaction rollback mechanism or logic can be used to restore all the objects to their respective old content or values as prior to the occurrence of the transaction. Generally, if a failure occurs when attempting to commit or complete a transaction of multiple objects, a system can implement either the transaction rollback logic so that all objects have their old content as prior to the transaction, or otherwise implement a transaction roll forward logic so that all objects of the transaction have their updated or new content.

In implementing the transaction rollback of the transactional logic using the techniques of the present disclosure in at least one embodiment, the old prior data or content stored at an SSD logical address can be retained and stored internally within the internal LS S of the SSD even though the old data or content stored at the SSD logical address is overwritten. The old data stored at the SSD logical address can be retained internally by the SSD in accordance with a defined retention policy. Additionally, the old data stored at the SSD logical address can be exposed and made available to SSD-external code, such as code executing on the data storage system, where such SSD-external code implements the transactional logic. In this manner, the SSD-external code can implement the transactional logic, such as for a transaction rollback, using the old data or content of the SSD logical address maintained internally by the SSD. In such an embodiment, the data storage system does not have to have its own SSD-external code perform processing to record or log the old content or values that can be needed in connection with implementing the transaction rollback, or more generally, the transactional logic. Rather, as may be needed, the SSD-external code can access and restore old prior data or content of a logical address where the old prior data or content can be retained internally by the SSD. In at least one embodiment, the SSD-external code can access, such as be reading, the old prior data or content of the SSD logical address and then update or rewrite the old prior data to the SSD logical address.

In at least one embodiment, the SSD can internally implement the LSS where data is written to a logical address, offset or location on the SSD. The SSD logical address can then be mapped internally by the LSS of the SSD to an underlying physical address of the SSD, where content or data is stored at the SSD physical address. With the LSS of the SSD, a data update written to a logical address, offset or location on the SSD does not overwrite or perform an in-place update of the originally mapped first SSD physical address. Rather, the update or overwrite, which is a second write to the SSD logical address, results in updating the mapping of the SSD logical address to a second SSD physical address which is different than the originally mapped first SSD physical address. Thus, the old data or content (of the SSD logical address) stored at the first SSD physical address is not physically overwritten with the new or updated data of the second write. The operation of the LSS of the SSD provides for retaining the old data stored at the first SSD physical address for some time, for example, until garbage collection or other reclamation processing is performed to reclaim the unused storage containing the old data. In at least one embodiment in accordance with the techniques of the present disclosure, the original or first mapping of the SSD logical address to the first SSD physical address, along with the old data or content stored at the first SSD physical address, can be retained in accordance with a defined retention policy. Thus, the defined retention policy can guarantee that the original or first mapping of the SSD logical address to the first SSD physical address, along with the old data or content stored at the SSD logical address, are available or preserved internally on the SSD after the second write or overwrite of the SSD logical address for some subsequent amount of time based on one or more conditions of the retention policy. Additionally, in at least one embodiment, the old data or content can be externally exposed outside of the SSD, such as through a command or API (application programming interface) of the SSD, to external code that is external to the SSD. In such an embodiment, code of the data storage system can use the command or API to access and read the old data or content of the SSD logical address which has been overwritten with new or updated content. The old content or data of the SSD logical address can be available and accessible to the external code for an amount of time and/or in accordance with other conditions specified in the defined retention policy. In such an embodiment where the old data or content may be needed such as for transactional rollback processing, the data storage system can omit additional processing which explicitly logs or stores the old data of the SSD logical address prior to overwriting or updating the SSD logical address with new data.

Transactional logic can be used to generally perform multiple updates to multiple objects for any suitable application or usage scenario. For example, metadata (MD) can be maintained and used by the data storage system where a single transaction can include updates to multiple MD pages. As such, all multiple MD pages need to atomically updated for transactional consistency. Alternatively, for transactional consistency, all multiple MD pages can retain their prior content as prior to performing any updates as part of rollback processing to rollback the transaction, for example, due to failure or error in connection with performing the transaction. However, the multiple MD pages cannot be exposed or used by a client in a transactionally inconsistent state where one or more of the MD pages have been updated and also one or more of the MD pages retain their old prior content. As another example of where a transactional update can be performed, consider updating a stripe across a RAID group of N members or drives for a RAID-5 or RAID-6 configuration. For existing RAID-5 and RAID-6 groups and configurations known in the art, a stripe across all RAID group members can include both data and parity, where the parity can be calculated from, and depend upon, the data of the same stripe. In such a case, the update to the stripe across all N members or drives of the RAID group must be performed in order to employ RAID group rebuilding or reconstruction techniques.

Since objects or pages are updated or written separately, when the transaction is incomplete or "torn", for example, because of system crash or any other failure, the state of pages or objects affected by the transaction is generally unpredictable. At the time of failure, some objects or pages of the transaction may be updated (e.g., contain new data or content), while others retain the prior old content. Generally, restoring the affected objects of the transaction to a transactionally consistent state (e.g., either all objects have old content or all objects have new content) is impossible without applying some transactional mechanism. In some existing systems, the standard mechanism that can be used to provide transaction consistency in case of failures is transactional logging. With transactional logging, the entire transaction content (e.g., either the prior old content or updated new content of all affected objects) can be copied and recorded in entries of a persistent log before updating the affected objects as stored on BE PDs, such as SSDs, providing backend non-volatile storage. After the transaction is complete and all affected objects have been successfully updated, the records or entries of the transactional log corresponding to the recorded transaction content can be invalidated and reclaimed for reuse. Thus, in case of any failure occurring prior to completing the transactional update to all affected objects, a transactionally consistent state may be restored using the recorded content of the transactional log.

The foregoing standard approach for transaction logging performed in existing systems has obvious drawbacks in that additional costs are incurred in terms of system resources which can adversely affect system performance. For example, additional costs are incurred due to the system writing and logging consistent data to the transactional log and then reclaiming the log records. Also, there are additional costs incurred in terms of the additional non-volatile storage consumed for the transactional log storage.

To avoid such drawbacks resulting from transactional logging of consistent data typically performed by a system, such as a data storage system, described in the following paragraphs are techniques of the present disclosure which utilize reversible write operations to offload transactional logging of prior content to a CSD, such as an SSD.

Consistent with other discussion herein in at least one embodiment, the SSD can implement an internal LSS such that data written to an SSD logical address does not physically overwrite or update the physical location storing the old data or existing content (e.g., no physical in place update). Rather, the newly written or updated data is written to a different physical location and SSD mapping information can be updated to map the SSD logical address to the different physical location on the SSD. Thus, the SSD can retain the old data in the original physical location for some time before reclaimed by the SSD internal garbage collection. Additionally, mapping information of the SSD that maps the SSD logical address to the original SSD physical address or location can also be retained to facilitate retrieval of the prior content or old data stored at the original SSD physical address.

Figure 3A:
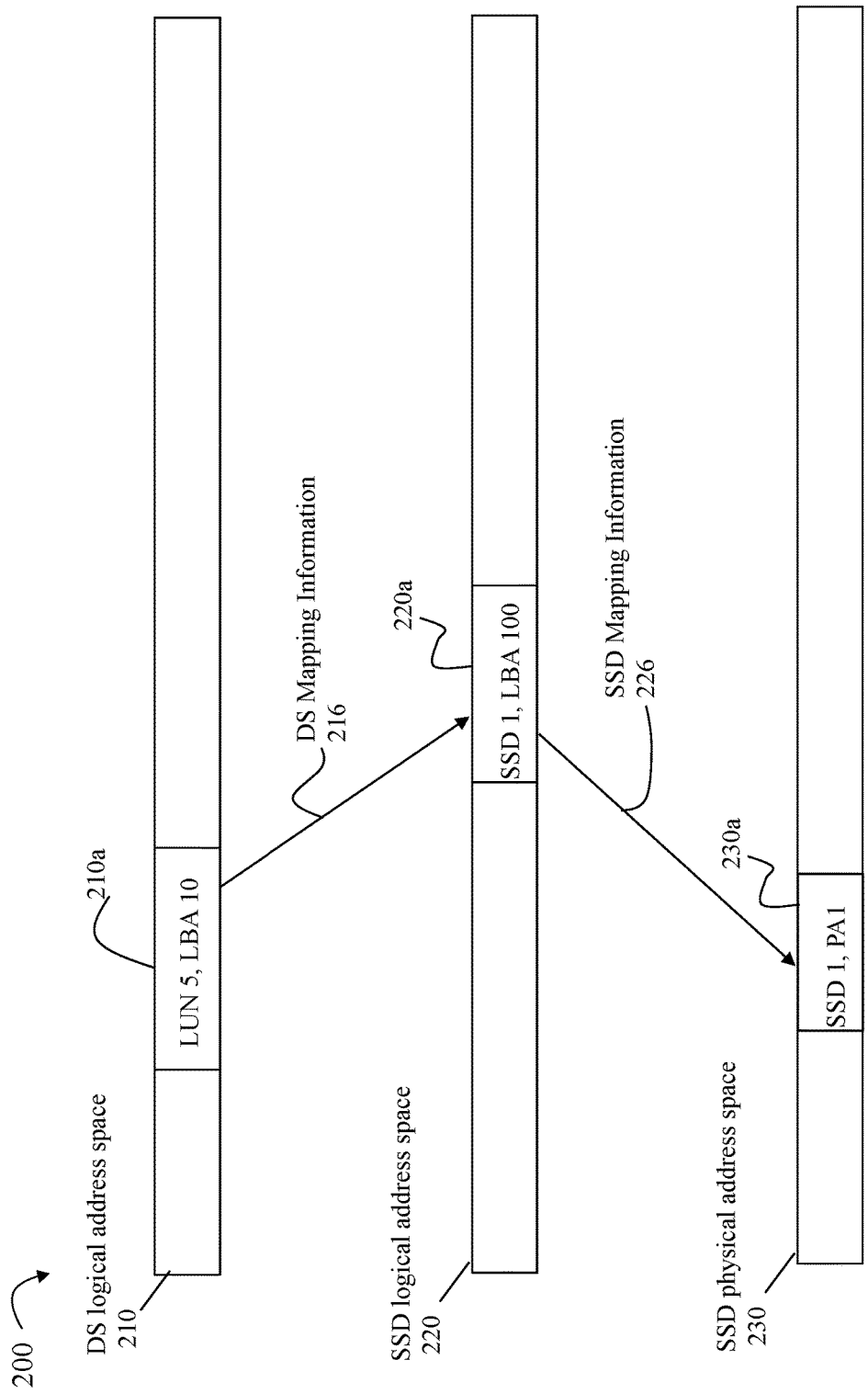
FIGS. 3A and 3B are examples illustrating mapping of address spaces in at least one embodiment in accordance with the techniques of the present disclosure.

Referring to FIG. 3A, shown is an example 300 illustrating mapping that can be performed in a data storage system and an SSD in at least one embodiment in accordance with the techniques of the present disclosure.

The example 200 includes a DS (data storage system) logical address space 210, an SSD logical address space 220, and an SSD physical address space 230. The DS can map a logical address from the DS address space 210 using DS mapping information 216 to a corresponding SSD logical address in the SSD logical address space 220. For example, the DS can maintain and manage DS mapping information 216 to map DS logical address 210a to the SSD logical address 220a. The DS logical address 210a can be, for example, a logical device and logical offset or block address (LBA) on the logical device. In the example 200, the DS logical address 210a is expressed as LUN 5, LBA 10 having its data or content stored at the SSD logical address 220a, where 220a can be expressed as a particular SSD, such as SSD1, and a logical block or LBA on the SSD1, such as the LBA 100.

Internally within the SSD, the SSD can map an SSD logical address of the SSD logical address space 220 to a corresponding SSD physical address in the SSD physical address space 230 using the SSD mapping information 226. For example, the SSD1 can maintain and manage the SSD mapping information 226 to map the SSD logical address 220a to the SSD physical address 230a. In the example 200, the SSD logical address 220a, SSD1, LBA 100, is mapped by the SSD mapping information 226 to the SSD physical address or location 230a, SSD1, PA (physical address) 1.

The DS mapping information 216 is maintained by a system, such as the data storage system, which is a client of the SSD, such as SSD1, where the SSD can internally manage and maintain the SSD mapping information 226.

Figure 3B:
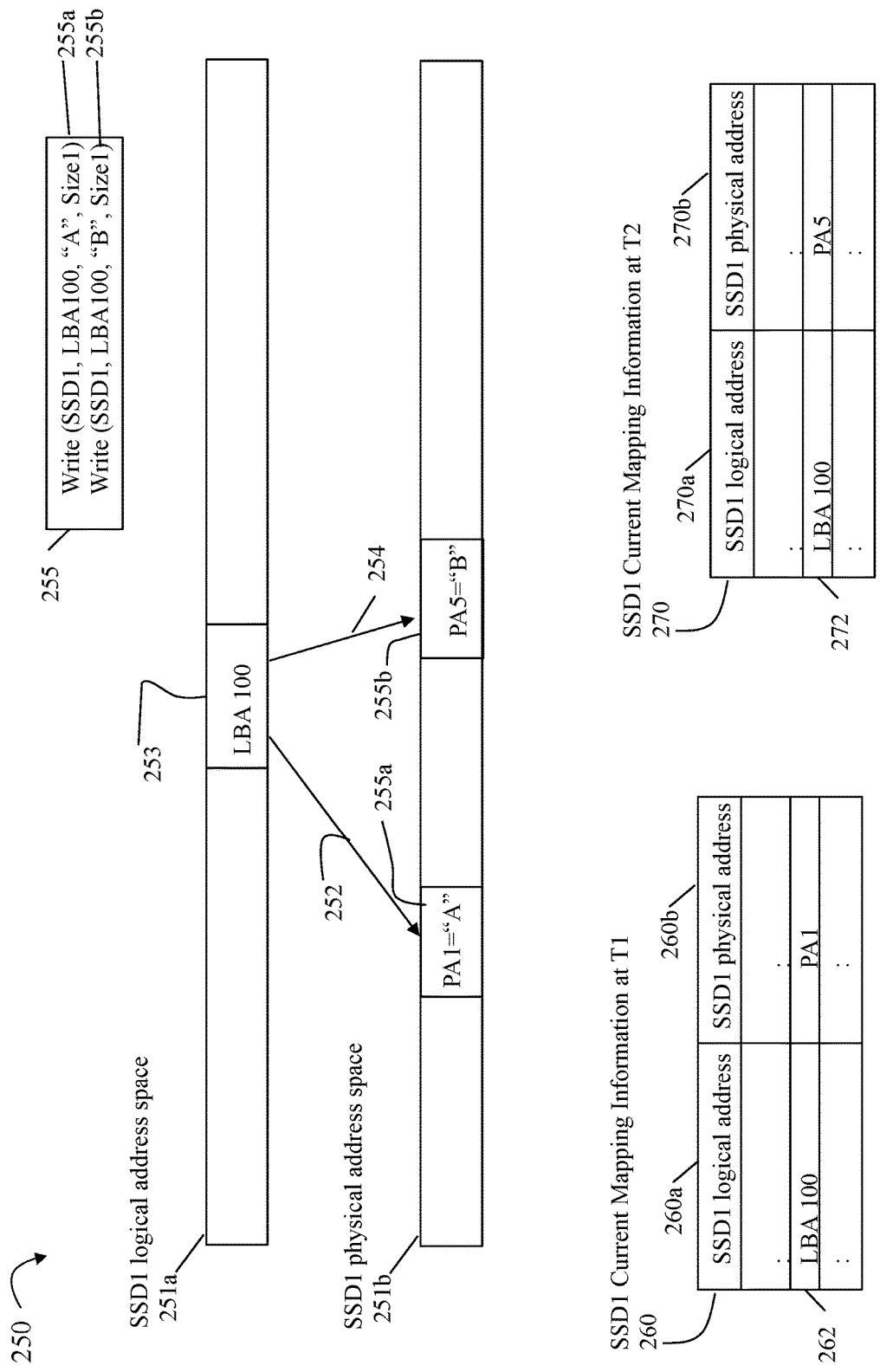

Referring to FIG. 3B, shown is an example 250 illustrating processing that can be performed when writing to an SSD, such as SSD1, with regular or normal write processing in at least one embodiment in accordance with the techniques of the present disclosure.

The example 250 includes the SSD1 logical address space 251a and the SSD1 physical address space 251b where the SSD1 can internally map SSD1 logical addresses of 251a to corresponding physical addresses of 25 lb using SSD internal mapping information as generally discussed above. To further illustrate, assume that there is a sequence of two writes 255a, 255b of 255 performed where the write 255a writes the content "A" to the SSD1 logical address of LBA 100 at a first time T1. Subsequent to the time T1 at a time T2, the write 255b writes the content "B" to the SSD1 logical address of LBA 100. Thus, the sequence of writes 255a, 255b can denote two successive writes to the same SSD1 logical address of LBA 100.

The element 260 represents the SSD1 current mapping information maintained and used internally within SSD1, where the element 260 reflects the SSD1 current mapping information after servicing the first write 255a, Write (SSD1, LBA 100, "A", Size1), where Size1 can denote the size, such as in SSD blocks, of the write. The element 260 denotes a table of the mapping information of SSD1 at the time T1 with a first column 260a of SSD1 logical addresses in the SSD1 logical address space 251a and a second column 260b of associated SSD1 physical addresses in the SSD1 physical address space 251b. The entry 262 is created in the mapping information 260 as a result of servicing the first write 255a where the content or data "A" is stored at PA1 for the SSD1 LBA 100. The arrow 252 illustrates the SSD1 current mapping information of the entry 262 where the SSD1 logical address LBA 100 (253) is mapped (252) by the entry 262 to the PA 1 (255a) where the content "A" is stored.

The element 270 represents the SSD1 current mapping information maintained and used internally within SSD1, where the element 270 reflects the SSD1 current mapping information after servicing the second write 255b, Write (SSD1, LBA 100, "B", Size1), where Size1 can denote the size, such as in SSD blocks, of the write. The write 255b can be characterized as logically overwriting or updating the LBA 100 (253) of the SSD1. The element 2670 denotes a table of the mapping information of SSD1 at the time T2 with a first column 270a of SSD1 logical addresses in the SSD1 logical address space 251a and a second column 270b of associated SSD1 physical addresses in the SSD1 physical address space 251b. The entry 272 is created in the mapping information 270 as a result of servicing the second write 255b where the content or data "B" is stored at PAS for the SSD1 LBA 100. The entry 272 can denote an update to the entry 262. The arrow 242 illustrates the SSD1 current mapping information of the entry 272 where the SSD1 logical address LBA 100 (253) is mapped (254) by the entry 272 to the PAS (255b) where the content "B" is stored.

Thus, the example 250 generally illustrates operation of the internal LSS of the SSD1 where newly written content or updates to the same SSD logical address 253 is stored at a different SSD physical location or address 255b than the existing content stored at the SSD physical location or address 255a. The current mapping information of 260 can denote SSD physical addresses storing current content for associated SSD logical addresses after servicing the first write 255a, and the current mapping information of 270 can denote SSD physical addresses storing current content for associated SSD logical addresses after servicing the second write 255b.

What will now be described in the following paragraphs, such as in connection with FIGS. 4A-4E, are examples of illustrating use of the techniques of the present disclosure with reversible write command in at least one embodiment. In at least one embodiment, a reversible write command can be issued to the SSD in a manner similar to the regular or normal write command with a difference in that the existing content or data (which is updated or logically overwritten with new data of the reversible write command) can be retained and made accessible by the SSD in accordance with a defined retention policy. The reversible write command can write the new data to an SSD logical address having existing content stored at a first SSD physical address. Thus, prior to servicing the reversible write command, the SSD has first mapping information that maps the SSD logical address to the first SSD physical address. The new data written by the reversible write command can be stored at a second SSD physical address that is mapped to the SSD logical address by second mapping information denoting the updated content of the SSD logical address. The SSD can internally retain and make accessible (e.g., externally outside of the SSD) to SSD clients the existing content stored at the first SSD physical address which denotes the prior content of the SSD logical address. In at least one embodiment, the SSD can retain the above-noted first mapping information and the first SSD physical address storing the existing content of the SSD logical address in accordance with the retention policy. Additionally, the SSD can provide a command or interface, such as a Read Old command, by which a client, such as the data storage system, can request the "old" or prior content of the SSD logical address as prior to servicing the reversible write command which logically overwrites or updates the SSD logical address. In at least one embodiment, the reversible write command can result in the SSD internally retaining the above-noted first mapping information and the first SSD physical address storing the existing content of the SSD logical address in accordance with the retention policy. For example, in at least one embodiment, servicing the reversible write command can include the SSD copying or saving the above-noted first mapping information internally within the SSD. The SSD can retain the first mapping information and the first SSD physical address storing the existing content of the SSD logical address in accordance with the retention policy. Different retention policies that can be used in an embodiment in accordance with the techniques of the present disclosure are discussed in more detail in the following paragraphs.

Generally, the FIGS. 4A-4E illustrate processing performed in connection with servicing a sequence of commands, operations or requests directed to an SSD, SSD1, in at least one embodiment in accordance with the techniques of the present disclosure.

Figure 4A:
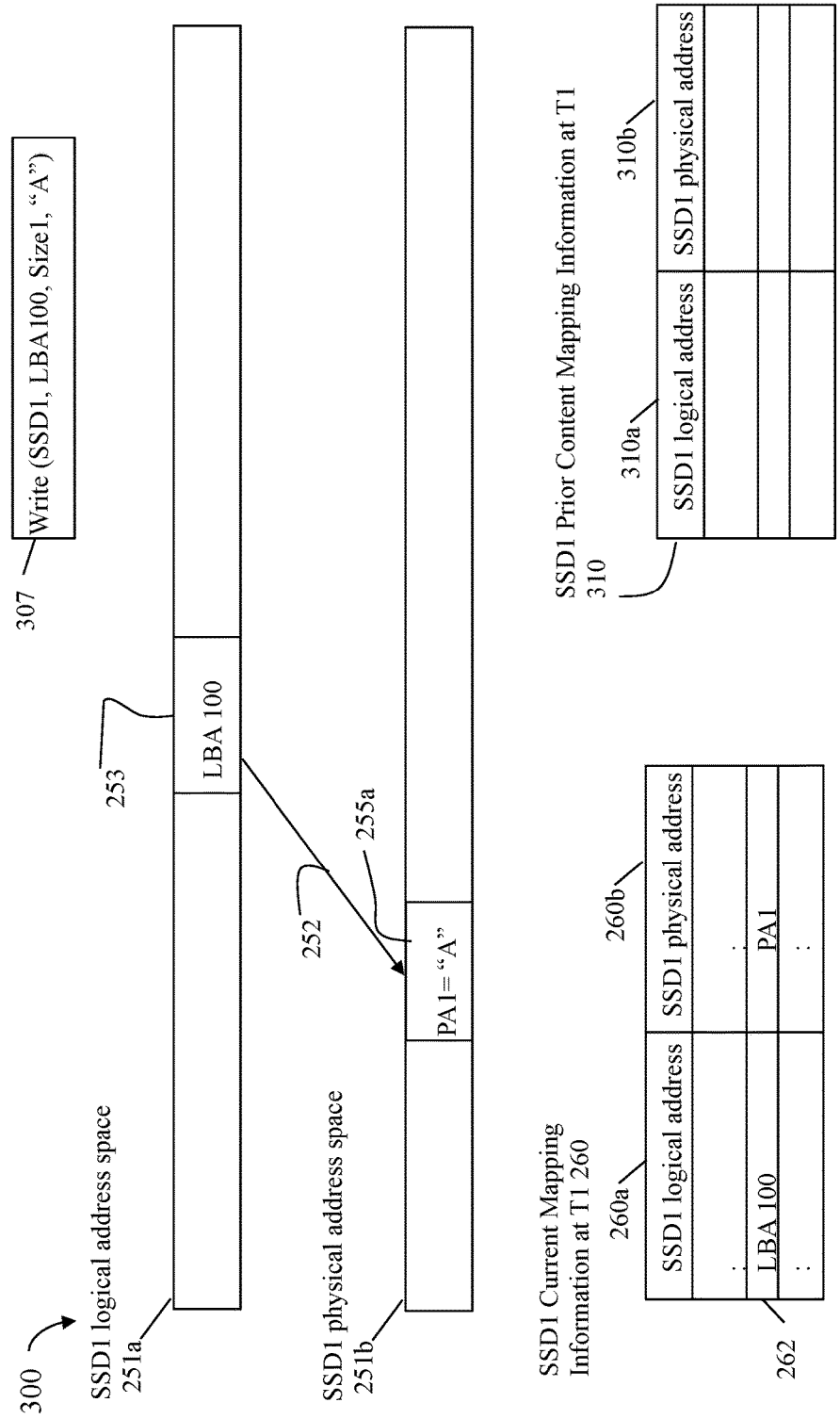
FIGS. 4A-4F are examples illustrating use of the techniques of the present disclosure in connection with servicing a sequence of commands issued to a physical storage device in at least one embodiment.

Referring to FIG. 4A, shown is an example 300 illustrating processing performed in connection with servicing the write 307 at a first point in time T1 in at least one embodiment in accordance with the techniques of the present disclosure.

The example 300 includes similarly numbered elements as in FIG. 3B. Additionally, element 307 of FIG. 4A denotes the same first write operation 255a of FIG. 3B. The example 300 also includes the element 310 denoting the SSD1 prior content mapping information. Generally, the element 310 can denote retained, preserved or saved mapping information for SSD logical addresses that have been logically updated or overwritten using a reversible write command. Prior to updating the current mapping information 260 to reflect any updates written to an SSD logical address by the reversible write command, existing mapping information for the SSD logical address can be copied, saved and retained in the prior content mapping information 310. The tables 260 and 270 reflect the state of the mapping information of such tables after servicing the write command 307. The command 307 can be characterized as a regular or normal write command that writes the content "A" to the SSD logical address LBA 100. Servicing the write command 307 by the SSD1 can include storing the written content "A" at PA1 255a and creating or updating the entry 262 in the current mapping information 260 to denote that the current content for LBA 100 of SSD1 is stored at SSD PA1 255. In connection with normal or regular write processing of the write 307, the table 310 is not updated. In this example 300, assume that the table 310 is empty after servicing the write 307 at the time T1.

Figure 4B:
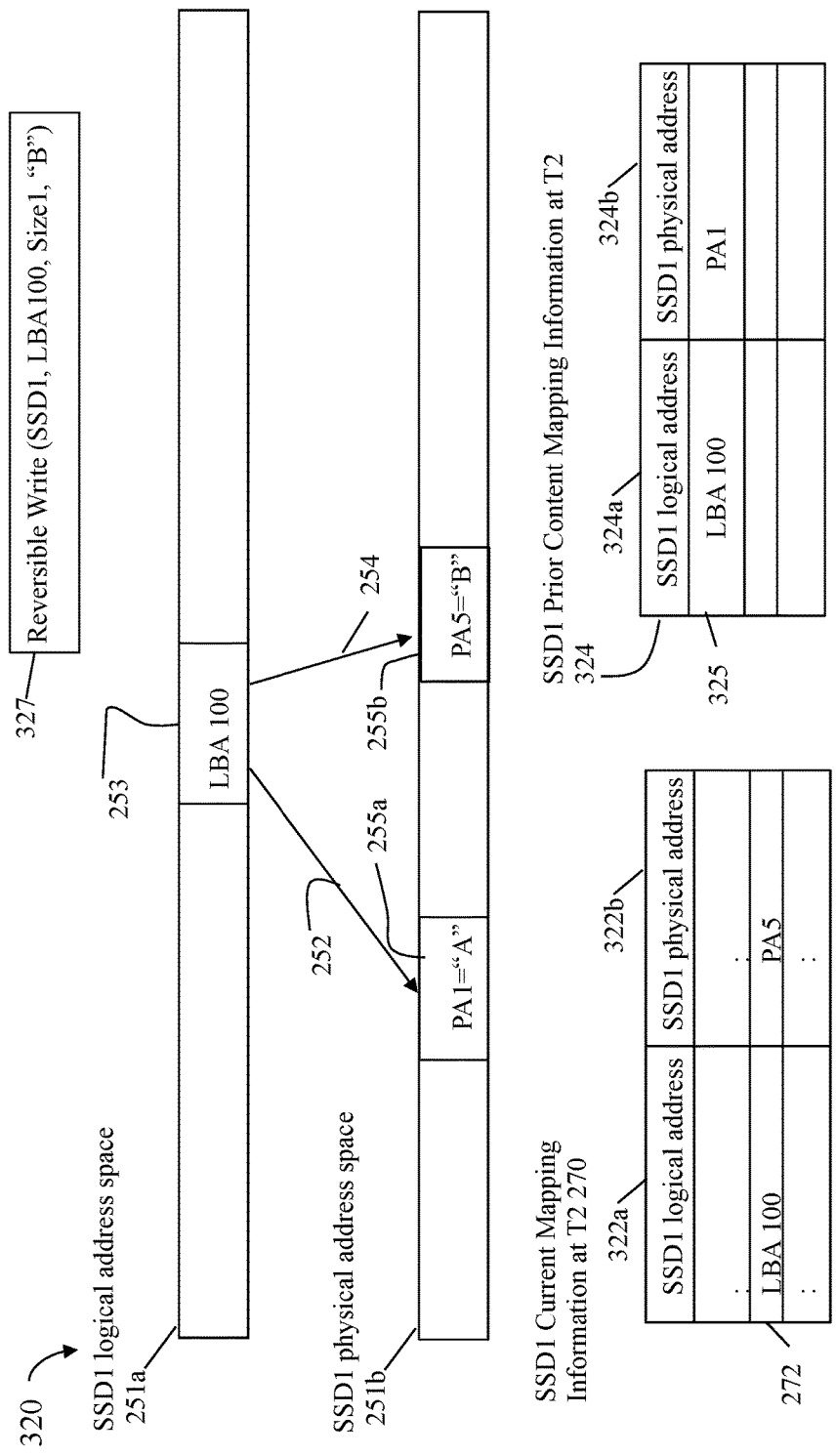

With reference to FIG. 4B, at a next sequential time T2 subsequent to T1, the reversible write command 327 can be received and serviced by the SSD1. The reversible write command 327 writes the data or content "B" to the SSD logical address LBA 100. Thus, the reversible write command 327 logically overwrites or updates the existing content of the LBA 100 as previously written by the write command 307.

The example 320 illustrates that servicing the reversible write command 327 includes storing the written content or data "B" at the SSD physical address PAS (255b). Additionally, the existing mapping information denoted by the entry 262 of 260 in FIG. 4A is retained or preserved along with the existing content or data of SSD1 LBA 100 as stored at PA 1 255a. As such, servicing the reversible write command 327 can include saving or copying the mapping information from the entry 262 (of FIG. 4A) to the entry 325 in the prior command mapping information table 324 (of FIG. 4B). Servicing the reversible write command 327 can also include updating the current mapping information 270 to include the entry 272 denoting that the current content for the SSD logical address, SSD1 LBA 100, is stored at the SSD physical address PAS.

Figure 4C:
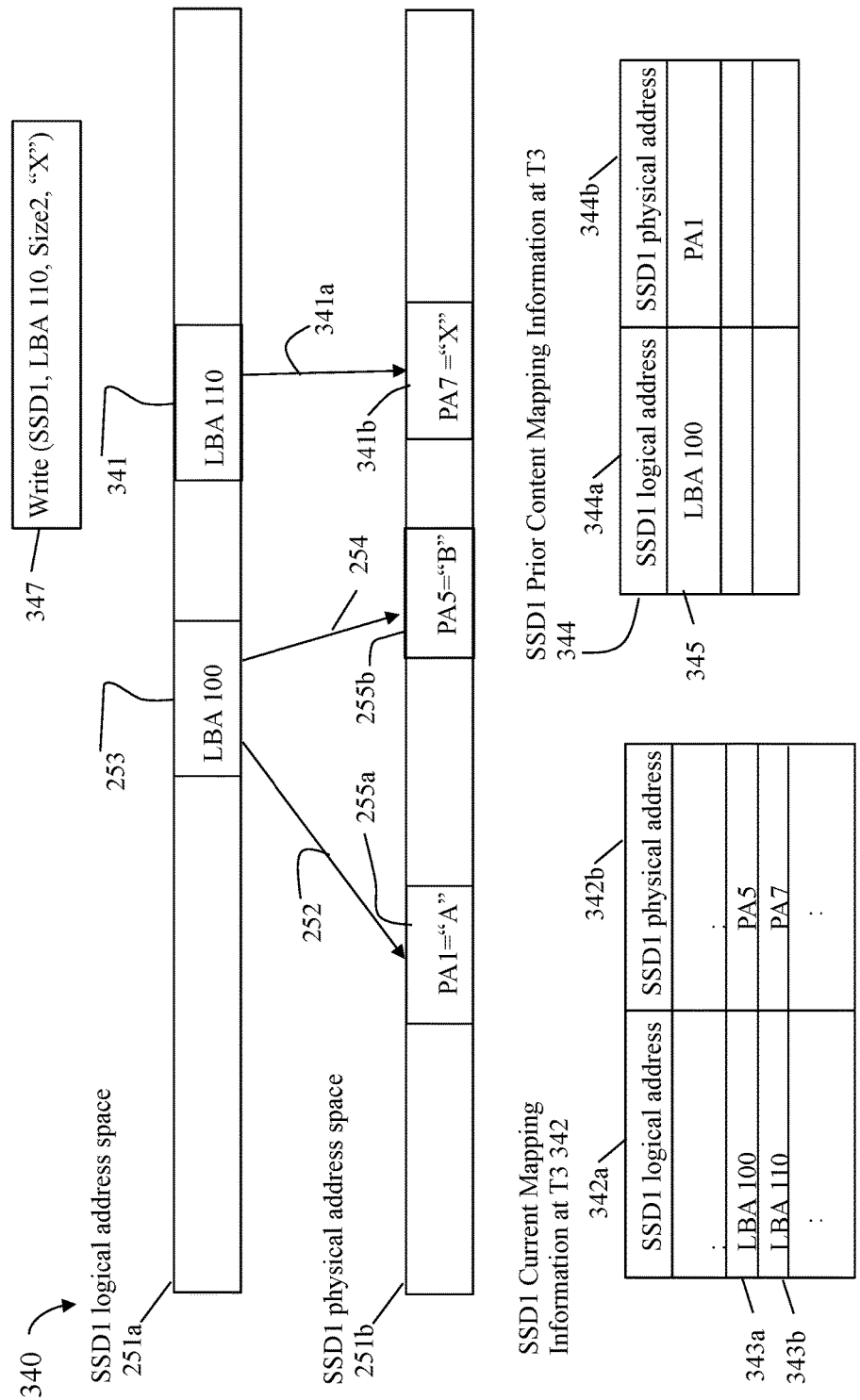

With reference to FIG. 4C, at a next sequential time T3 subsequent to T2, the write command 347 can be received and serviced by the SSD1. The write command 347 writes the data or content "X" to the SSD logical address LBA 110.

The example 340 illustrates that servicing the write command 347 includes storing the written content or data "X" at the SSD physical address PA7 (341b). Additionally, servicing the write command 347 in accordance with regular or normal write processing can include updating the current mapping information 342 to include the entry 343b denoting that the current content for SSD1 LBA 110 is stored at the SSD physical address PA7. The entry 343a of FIG. 4C corresponds to the existing entry 272 of FIG. 4B. In connection with processing the write command 347, the prior content mapping information 344 is not updated or modified and includes the same information as in the table 324 of FIG. 4B. Thus, the tables 342 and 344 represent the state of the mapping information after servicing the write 347 at the time T3. The table 342 of FIG. 4C as compared to the table 270 (of FIG. 4B) differs in that the table 342 at the time T3 includes the additional entry 343b. The entry 343a of FIG. 4C denotes the same information as the entry 272 of FIG. 4C.

The example 340 illustrates that the SSD LBA 110 (341) written to by the write command 347 is mapped (341a) by the entry 343b to the SSD physical address PA7 (341b).

Figure 4D:
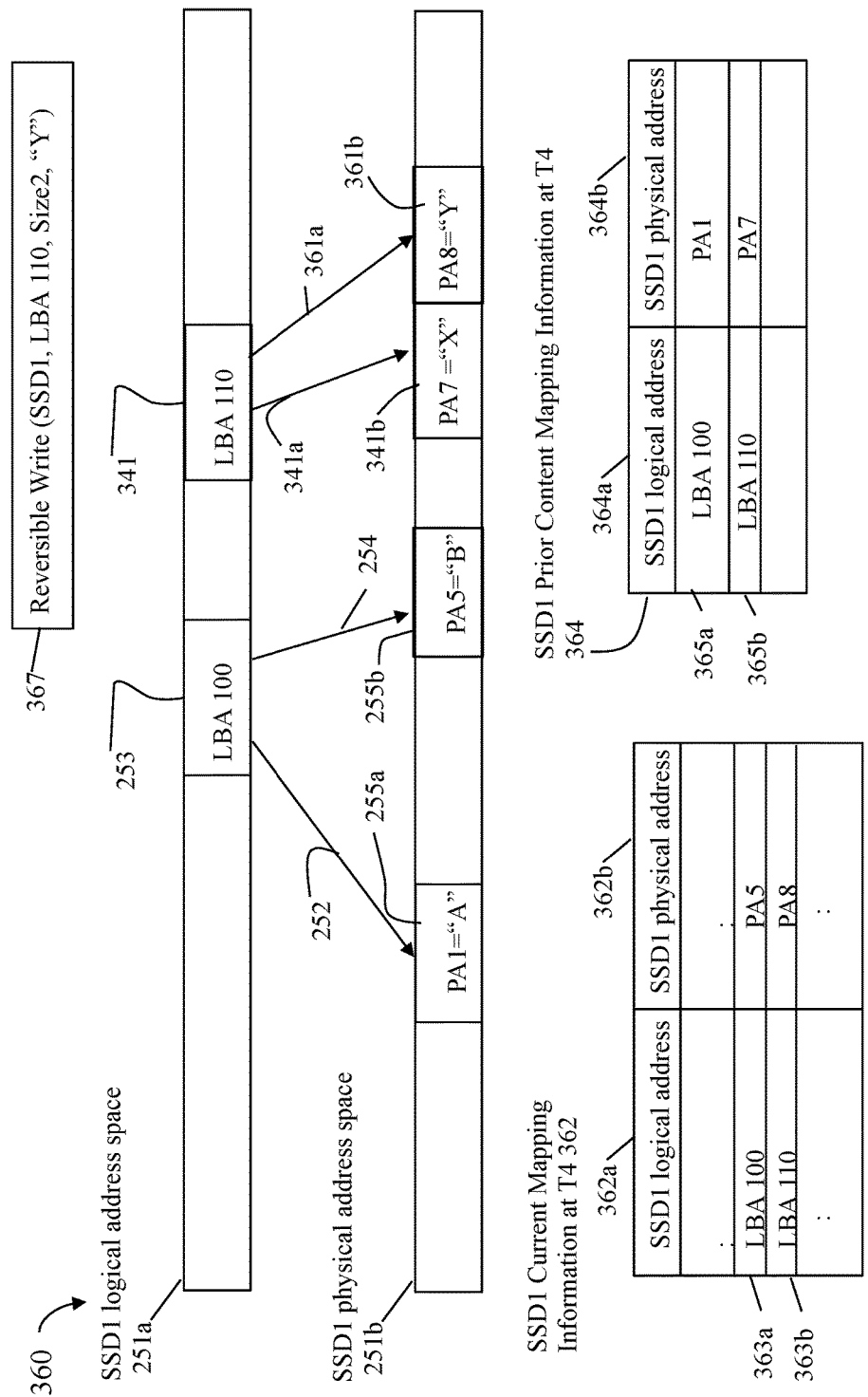

With reference to FIG. 4D, at a next sequential time T4 subsequent to T3, the reversible write command 367 can be received and serviced by the SSD1. The reversible write command 367 writes the data or content "Y" to the SSD logical address LBA 110. Thus, the reversible write command 367 logically overwrites or updates the existing content of the LBA 110 as previously written by the write command 347.

The example 360 illustrates that servicing the reversible write command 367 includes storing the written content or data "Y" at the SSD physical address PA8 (361b). Additionally, the existing mapping information denoted by the entry 343b of 342 in FIG. 4C is retained or preserved along with the existing content or data of SSD1 LBA 110 as stored at PA7 341b. As such, servicing the reversible write command 367 can include saving or copying the mapping information 343b (of FIG. 4C) to the entry 365a (of FIG. 4D) in the prior command mapping information table 364. Servicing the reversible write command 367 can also include updating the current mapping information 362 to include the entry 363b denoting that the current content for SSD1 LBA 110 is stored at the SSD physical address PA8. The entry 363a of FIG. 4D corresponds to the existing entry 343a of FIG. 4C. In connection with processing the reversible write command 367, the prior content mapping information 344 of FIG. 4C is updated to the state as denoted by the table 364 of FIG. 4D, where the entry 365a denotes the same existing entry 345 of 344 of FIG. 4C, and where the entry 365b is newly added to the prior content mapping information 364 as a result of processing the reversible write command 367. Thus, the tables 362 and 364 of FIG. 4D represent the state of the mapping information after servicing the reversible write 367 at the time T4. The table 362 of FIG. 4D as compared to the table 342 of FIG. 4C differs in that the table 362 at the time T4 includes the additional entry 363b. The table 364 of FIG. 4D as compared to the table 344 of FIG. 4C differs in that the table 364 at the time T4 includes the additional entry 365b.

The example 360 illustrates that the SSD LBA 110 (341) written to by the reversible write command 367 is mapped (361a) by the entry 363b to the SSD physical address PA8 (361b).

Figure 4E:
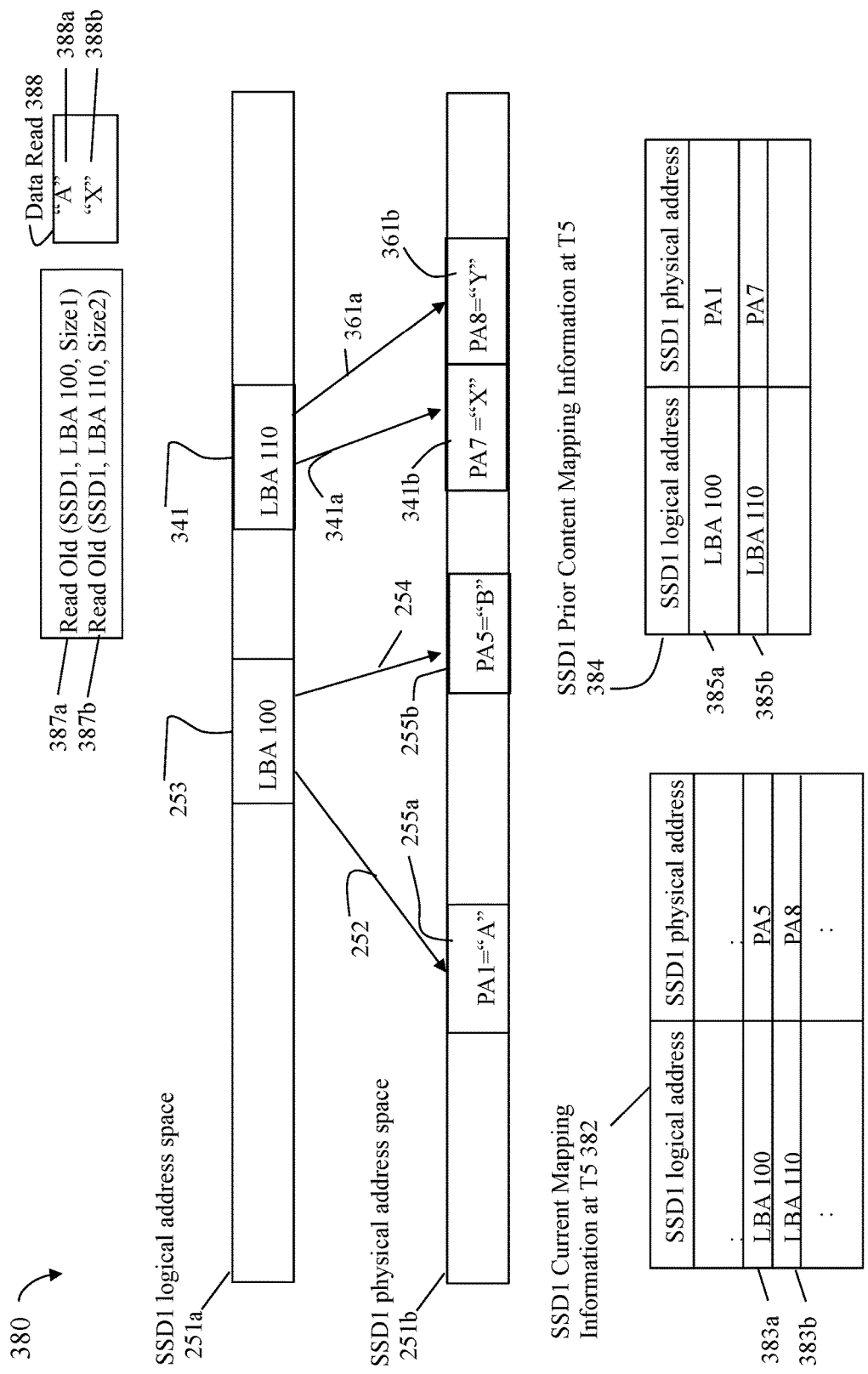

With reference to FIG. 4E, at a next sequential time T5 subsequent to T4, a sequence of two Read Old commands 387a-b can be received and serviced by the SSD1. In at least one embodiment in accordance with the techniques of the present disclosure, the Read Old command can be used to read the old or prior content of a specified SSD LBA, where the old or prior content corresponds to the content of the specified SSD LBA as prior to issuing and servicing a reversible write to the specified SSD LBA. In such an embodiment, the reversible write to the specified SSD LBA and the Read Old command to the same specified SSD LBA can be issued in succession without any intervening commands that update the content of the specified SSD LBA.

FIG. 4E includes the same elements and information as in FIG. 4D with the difference that FIG. 4E includes the Read Old commands 387a-b and the data read 388. The tables 382 and 384 of FIG. 4E denote the state after processing the Read Old commands 387a-b. Since the Read Old commands 387a-b do not modify or update the tables 362 and 364 of FIG. 4 from the prior time T4, the tables 382, 384 of FIG. 4E include the same information, respectively, as the tables 362, 364 of FIG. 4D.

The Read Old command 387a is a request to read the previous or logically overwritten content stored at the LBA 100, and the Read Old command 387ba is a request to read the previous or logically overwritten content stored at the LBA 110.

In the example 380, the Read Old command 387a is a request to read the prior content stored at the LBA 100 as prior to issuing and servicing the reversible write command 327 of FIG. 4B at the time T2. Servicing the Read Old command 387a includes the SSD1 querying the prior content mapping information 384 for an entry denoting overwritten, prior or old content for the SSD LBA 100. If no such entry is located in the table 384 of prior content mapping information, an error can be returned to the Read Old command. Otherwise, as in this example 380, the entry 385a is located for the SSD LBA 100, where the entry 385a indicates that PA1 includes the prior, old or overwritten content previously stored at the SSD LBA 100 prior to issuing and servicing the immediately prior reversible write command 327 of FIG. 4B. The SSD1 can service the Read Old command 387a using the entry 385a to retrieve the prior, old or overwritten content "A" stored at the SSD physical address PA1 (255b), and then return the read content "A" in response to the Read Old command 387a.

In the example 380, the Read Old command 387b is a request to read the prior content stored at the LBA 110 as prior to issuing and servicing the reversible write command 367 of FIG. 4D at the time T4. Servicing the Read Old command 387b includes the SSD1 querying the prior content mapping information 384 for an entry denoting overwritten, prior or old content for the SSD LBA 110. If no such entry is located in the table 384 of prior content mapping information, an error is returned to the Read Old command. Otherwise, as in this example 380, the entry 385b is located for the SSD LBA 110, where the entry 385b indicates that PA7 includes the prior, old or overwritten content previously stored at the SSD LBA 110 prior to issuing and servicing the immediately prior reversible write command 367 of FIG. 4D. The SSD1 can service the Read Old command 387b using the entry 385b to retrieve the prior, old or overwritten content "X" stored at the SSD physical address PA7 (341b), and then return the read content "X" in response to the Read Old command 387b.

Figure 4F:
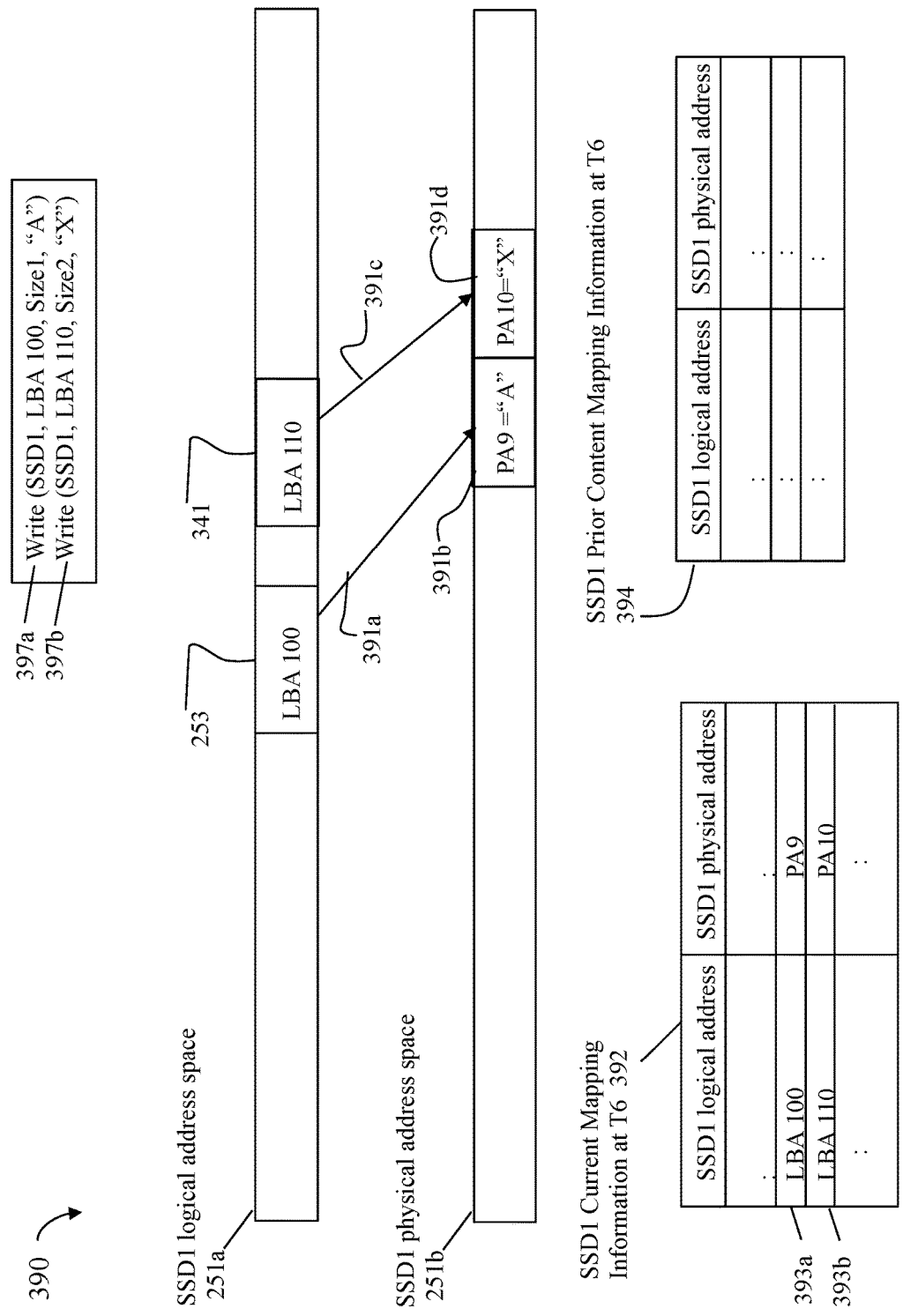

With reference to FIG. 4F, at a next sequential time T6 subsequent to T5, a sequence of two write commands 397a-b can be received and serviced by the SSD1. The write commands 397a-b can be regular or normal write commands that restore the contents of the SSD logical addresses LBA 100 and LBA 110 to their previous state or content as prior to issuing and prior to servicing the reversible write commands 327 (of FIG. 4B) and 367 (of FIG. 4D). Thus, the reversible write command in at least one embodiment results in the SSD internally retaining or preserving mapping information for an SSD logical address and also retaining and preserving the prior, old or overwritten content stored at the SSD logical address. The prior or old content of the SSD logical address can be subsequently read (using the Read Old command) and then restored or rewritten, using a regular or normal write command.

In the example 390, the write command 397a writes the prior content "A" to the SSD1 LBA 100. The prior content "A" is returned in response to the prior Read Old command 387a for the SSD logical address LBA 100 on the SSD1. Servicing the write command 397a includes storing the content "A" at a new SSD physical address PA9 (391b) and updating the current mapping information 392 to include the entry 393a indicating that the current content for LBA 100 of the SSD1 is stored at the SSD1 physical address PA9. The example 390 illustrates that the SSD LBA 100 (253) is mapped (391a) by the entry 393a of the current mapping information 392 to the SSD physical address PA9 (391b).

In the example 390, the write command 397b writes the prior content "X" to the SSD1 LBA 110. The prior content "X" is returned in response to the prior Read Old command 387b for the SSD logical address LBA 110 on the SSD1. Servicing the write command 397b includes storing the content "X" at a new SSD physical address PA10 (391d) and updating the current mapping information 392 to include the entry 393b indicating that the current content for LBA 110 of the SSD1 is stored at the SSD1 physical address PA10. The example 390 illustrates that the SSD LBA 110 (341) is mapped (391c) by the entry 393b of the current mapping information 392 to the SSD physical address PA10 (391d).

In at least one embodiment, the prior, old or overwritten content of an SSD logical address that is updated or logically overwritten using a reversible write command can be retained and accessible externally outside of the SSD, such as by an SSD client such as the data storage system, in accordance with a defined retention policy. The retention policy can specify one or more criteria or conditions under which the prior, old or overwritten content of an SSD logical address that is updated or logically overwritten using a reversible write command are retained and accessible externally outside of the SSD.

For example, in at least one embodiment, the retention policy can be a first retention policy indicating that the N last or most recently overwritten or updated SSD logical addresses which are updated or written to using the reversible write command can be retained and accessible, such as using the Read Old command. In such an embodiment using the first retention policy, the SSD can retain and preserve mapping information, such as the entry 385a of FIG. 4E, as well as retain and preserve the prior content stored at an SSD physical address, such as PA1 referenced by the retained entry 385a of FIG. 4E. Thus, for example, in at least one embodiment, the table 394 of the prior content and mapping information can include N entries, where N can be any suitable integer. A next entry of the table 394 can be consumed each time a subsequent reversible write command is serviced. Once all the entries in the table 394 are consumed, in at least one embodiment, the oldest existing entry in the table 394 can be reclaimed and then replaced or updated with retained mapping information of the next subsequent reversible write command that is serviced. In at least one embodiment, the entries in the table 394 can be reclaimed and consumed in a sequential and circular manner from beginning (e.g., entry 1) to end (entry N), where entries are then evicted and updated in a sequential manner restarting from the beginning to the end of the table 394. In such an embodiment of an SSD implementing the first retention policy, the retained or preserved N entries of mapping information from SSD logical addresses to SSD physical addresses storing the old or prior content of the SSD logical addresses are not deleted or reclaimed as part of garbage collection performed internally within the SSD. Additionally, the identified SSD physical addresses storing the old or prior content which is also preserved are not reclaimed as part of garbage collection performed internally within the SSD.

For purposes of illustration, assume the tables 392 and 394 denote the contents of such tables of mapping information subsequent to the SSD1 servicing the writes 397a-b but prior to receiving and servicing any other commands. Also, assume that the SSD1 operates in accordance with the retention policy noted above where the N last or most recently overwritten or updated SSD logical addresses which are updated or written to using the reversible write command are retained and accessible, such as using the Read Old command. In this example 390, the table 394 of SSD1 prior content mapping information can include no entries. In particular, the entries 385-b of 384 of FIG. 4E can be reclaimed, removed, invalidated or otherwise made available for reuse subsequent to servicing the writes 397a-b. Additionally, the content stored at the SSD physical addresses PA1 255a and PAS 255b can be invalidated where PA1 255a and PAS 225b can be reclaimed, such as by SSD internal garbage collection, for reuse by the SSD1. It should be noted that the entries 385a-b (of FIG. 4E) can be reclaimed removed, invalidated or otherwise made available for reuse subsequent to servicing the writes 397a-b since the mapping information of the entries 385a-b, as well as the content of PA1 and PAS, are no longer needed after receiving and processing the writes 397a-b. The table 394 of FIG. 4F shows the state of the prior content mapping information after reclaiming entries 385a-b (of FIG. 4E).

In at least one embodiment, the reversible write command can be used to retain and preserve prior, old or overwritten content of an SSD logical address, where the SSD logical address has its content overwritten or updated by the reversible write command. Furthermore, the prior, old or overwritten content can be exposed and made accessible externally outside of the SSD such as to a client of the SSD. The client of the SSD can be, for example, the data storage system that issues commands to the SSD such as, for example, reads, writes, Read Old commands, and/or reversible write commands to the SSD.

As another example, a second retention policy can be defined and in effect in an SSD in accordance with the techniques of the present disclosure. The second retention policy can specify that a prior, old or overwritten value of an SSD logical address that is overwritten by a reversible write command can be retained, preserved and accessible for a specified amount of time K. K can be in any suitable time units. In at least one embodiment, K can be measured starting from when the reversible write command overwriting old content of an SSD logical address is received by the SSD or serviced by the SSD.

As yet another example, a third retention policy that can be defined and in effect in an SSD in accordance with the techniques of the present disclosure. The third retention policy can specify that a prior, old or overwritten value of an SSD logical address that is overwritten by a reversible write command can be retained, preserved and accessible until explicitly released or reclaimed. In such an embodiment using the third retention policy, the reversible write can result in creating an entry in the SSD prior content mapping information table such as described above in connection with FIGS. 4A-4F with the difference that the SSD retains 1) the prior, old or overwritten content stored at an SSD physical address and also retains 2) the entry mapping the SSD logical address to the SSD physical address storing the prior, old or overwritten content, and also makes the prior, old or overwritten content externally accessible until the SSD receives an explicit command to reclaim or release the mapping and the SSD physical address storing the prior, old or overwritten content. To further illustrate the latter retention policy with explicit reclamation or releasing, a two-phase write can be implemented. For example, the following Command Sequence A1 of commands can be issued to the SSD identified as SSD1:

reversible write (SSD1, LBA 110, Size2, "Y")
reclaim old (SSD1, LBA 110)
where the command
reversible write (SSD1, LBA 110, Size2, "Y")
denotes the reversible write command 367 as described in connection with FIG. 4D.

With the third retention policy in effect and with reference to FIG. 4D, the SSD1 can reclaim or reuse the entry 365b of the prior content mapping information 364 and can reclaim or reuse storage of the SSD physical address PA7 225b responsive to the SSD1 receiving and processing the subsequent second command, reclaim old (SSD1, LBA 110). Generally, there can be other commands between the reversible write and the reclaim old commands noted above.

The foregoing paragraphs provide examples of 3 retention policies that can be configured and used in at least one embodiment in accordance with the techniques of the present disclosure. More generally, an embodiment can use any suitable retention policy in accordance with the techniques of the present disclosure.

In at least one embodiment, the SSD can implement a single retention policy that is non-configurable and fixed.

As a variation in at least one embodiment, the retention policy can be configurable and can be selected from multiple candidate retention policies. For example, an SSD can be configured to operate in accordance with multiple retention policies. The particular policy in effect can be configurable to a default policy or a selected one of the multiple retention policies in any suitable manner. For example, in at least one embodiment, the particular retention policy in effect at a point in time can be dynamically set and/or modified such as using a command or API issued to the SSD. A default retention policy can be in effect absent setting, specifying or selecting one of the available retention policies for which the SSD is configured to support.

In at least one embodiment, one or more parameters of a retention policy can be specified and dynamically modified such as using an API or command. For example, consider the above-noted second retention policy using K denoting an age or amount of time. In this case, the amount of time that old or overwritten content and the associated SSD prior content mapping (SSD logical to physical address) is retained can be specified as a configurable parameter. By default, a default value can be specified for the amount of time K which can be further modified or configured.

As another example, consider the first retention policy described above with "N" denoting the number of updates or overwrites done with the reversible write command, where the prior or old content of such updates or overwrites of an SSD logical address are guaranteed to be externally accessible such as, for example, using a Read Old command. In at least one embodiment, "N" can be configurable up to a maximum allowable value and can have a default value. In this manner, larger values for "N" allow for allocating more internal SSD storage for use with retaining and guaranteed overwrites; and smaller values for "N" allow for reducing the amount of internal SSD resources used with retaining and guaranteeing accessibility of overwritten of updated content of SSD logical addresses updated using reversible write commands.

The embodiments described above can use a reversible write command that enables a reversible write mode for a particular SSD at the per write command level. For example, as illustrated in connection with FIGS. 4A-4E, a sequence of commands to SSD1 can be issued which includes both reversible writes as well as regular or normal writes. As a variation, an embodiment can have a reversible write mode setting or command that can be issued to a particular SSD and can remain effect for all writes to the particular SSD until the setting is further modified. In such an embodiment, each single write command can be further implied or interpreted to have the particular reversible write mode setting currently in effect. For example, consider the following Command Sequence A2 issued to SSD1:

C1 Reversible write mode (SSD1, ON)
C2 write (SSD1, LBA1, Size, "A")
C3 write (SSD1, LBA3, Size, "C")
C4 Reversible write mode (SSD1, OFF)
C5 write (SSD1, LBA2, Size, "B")

where the command C1 sets the reversible write mode for SSD1 to ON so that the write commands C2 and C3 are implemented or serviced by the SSD1 as reversible writes. The command C4 then modifies the reversible write mode for SSD1 to OFF so that the write command C5 is implemented or serviced as a regular or normal write (e.g., non-reversible or regular write processing). In such an embodiment, a default setting such as OFF can be specified for the reversible write mode for an SSD.

In at least one embodiment, the reversible write command can be used in connection with transactional update processing performed, for example, by code executing on a data storage system that issues commands to the SSD. For purposes of illustration, assume that the retention policy in effect or implemented for the SSD is the first retention policy described above where the prior or old contents, which is updated or overwritten by the most recent "N" overwrites performed to SSD logical addresses using the reversible write command, are guaranteed to be accessible such as using the Read Old command. Assume that a transaction updates X blocks (e.g., X SSD LBAs or blocks). Also assume that there are Z blocks that are outstanding, incomplete or in progress updates for transactions that are currently in progress or incomplete. For example, assume that a current transaction TX10 needs to update X blocks, that there is a pending or in progress transaction TX5 that is updating 5 SSD blocks or LBAs, and a pending or in progress transaction TX6 that updates 6 SSD blocks or LBAs. In this case, TX5 and TX6 are in progress and incomplete when the transactional update processing is servicing the current transaction TX10, where Z=11 blocks of outstanding, incomplete or in progress transactions TX5 and TX6. Generally, Z can be a counter that is incremented for each block updated by an in progress and incomplete transaction. Once a transaction completes so that all block updates of the transaction are complete, Z can be decremented by the number of blocks of the completed transaction.

Figure 5:
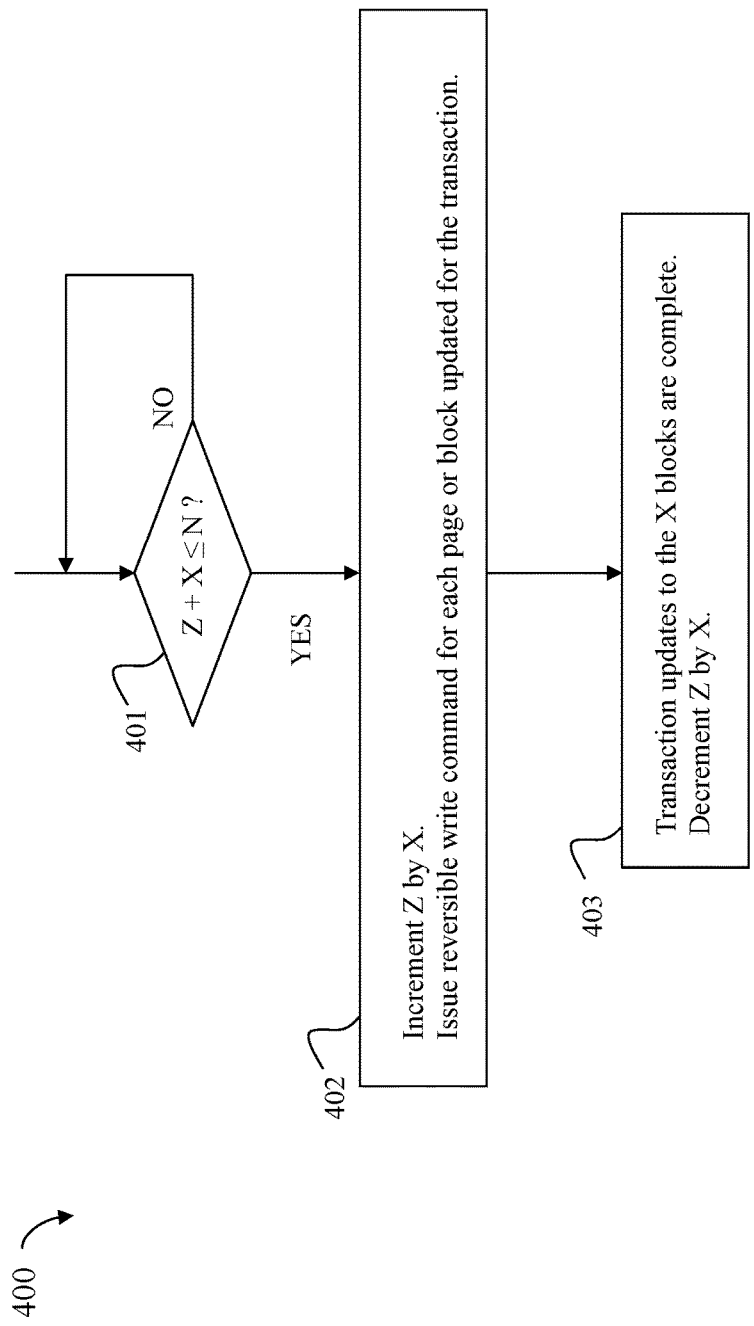
FIGS. 5, 6, 7 and 8 are flowcharts of processing steps that can be performed in at least one embodiment in accordance with the techniques of the present disclosure.

Referring to FIG. 5, shown is a flowchart 400 of processing steps that can be performed in an embodiment in accordance with the techniques of the present disclosure to process a transaction.

At a first step 401, the transactional update processing can include determining whether the sum of Z, the number of outstanding blocks, and X is less than or equal to N. As an equation, the foregoing condition evaluated at the step 401 can be represented as:

$$Z+X \leq N \qquad \text{EQUATION 1}$$

where processing waits at the step 401 until the condition denoted by EQUATION 1 evaluates to true. Once the condition denoted by EQUATION 1 evaluates to true, control proceeds from the step 401 to the step 402. For purposes of illustration, assume that Z=11 (as noted above) and additionally that N=20 and X=5 so that EQUATION 1 evaluates to true.

At the step 402, Z can be incremented by X, the number of blocks to be updated by TX 10. In this example, Z is now incremented from 11 to 16. Additionally in the step 402, a reversible write command can be issued for each of the X=5 blocks to be updated by the current transaction TX10. For example, assume that TX10 needs to update at least some of the data of 5 pages P1-P5 stored, respectively, at 5 SSD logical addresses LA1-LA5. In this case, the step 402 can include issuing the following 5 reversible write commands:

reversible write (SSD, LBA LA1, size, "UPDATE1")
reversible write (SSD, LBA LA2, size, "UPDATE2")
reversible write (SSD, LBA LA3, size, "UPDATE3")
reversible write (SSD, LBA LA4, size, "UPDATE4")
reversible write (SSD, LBA LA5, size, "UPDATE5")

From the step 402, control proceeds to the step 403. At the step 403, all X=5 blocks of TX10 have been successfully updated and the counter Z can be decremented by X, which is 5 in this case.

If an error or failure occurs while performing the step 402 above prior to completing the updates to all X=5 blocks of TX10, rollback processing can be triggered and performed to rollback or restore any of the 5 blocks or pages updated by TX10 to their respective old or prior content as prior to issuing the reversible write commands in the step 402. For example, assume that TX10 needs to update at least some of the data of each of the 5 pages P1-P5 stored, respectively, at the 5 SSD logical addresses LA1-LA5. Also assume that rollback processing for the transaction TX10 is triggered after P1 stored at LA1 has been updated. However, none of the other remaining pages P2-P5 stored, respectively, at the SSD logical addresses LA2-LA5 have yet been updated. In this case, rollback processing can issue the Read Old command as described herein to read the old or prior content of P1 as stored at the SSD logical address LA1, and then can issue a write command to restore or rewrite the old or prior content to P1 stored at the SSD logical address LA1.

In cases where rollback processing is triggered and the transaction is torn where the updates for the transaction are incomplete, rollback processing can use any suitable technique to determine which blocks or pages of the transaction have been updated and otherwise need to be restored such as, for example, using the Read Old and write command (e.g., normal or regular write command processing). For example, updated content can be distinguished from old or prior content using timestamps, generation identifiers (IDs) that are unique and can monotonically increase with each update (e.g., higher or larger generation ID denotes the most recent version or update of a particular page or block of data), and the like. As a variation, rollback processing can always rollback or restore all X blocks or pages of the incomplete transaction for which rollback processing is being performed.

Figure 6:
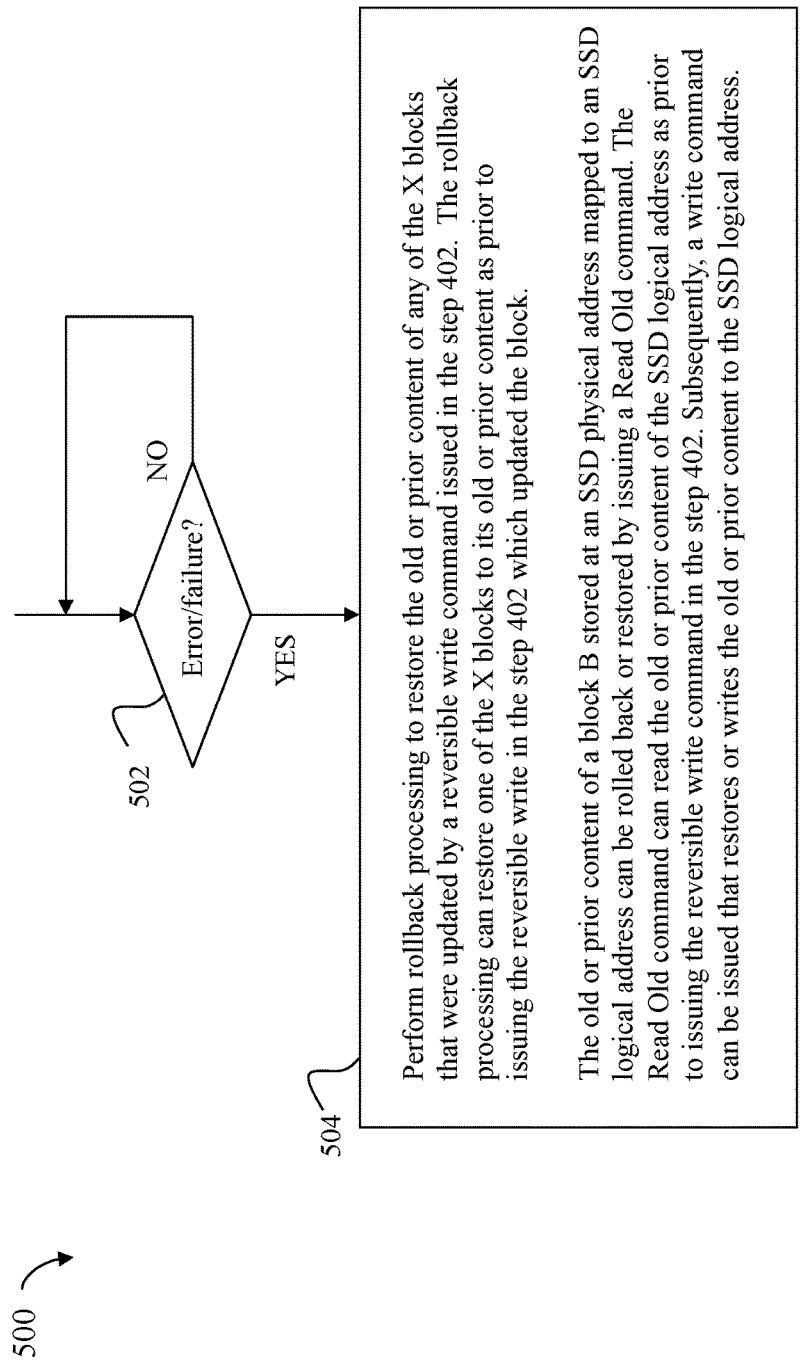

Referring to FIG. 6, shown is a flowchart 500 of processing steps that can be performed in an embodiment in accordance with the techniques of the present disclosure to perform rollback processing for a transaction.

At the step 502, a determination can be made as to whether an error or trigger condition has occurred that triggers rollback processing for a transaction. Control remains at the steps 502 until the step 502 evaluates to yes or true. Response to the step 502 evaluating to yes or true, control proceeds to the step 504 to perform rollback processing for the transaction.

At the step 504, rollback processing can be performed to restore the old or prior content of any of the X blocks of the transaction that were updated by a reversible write command issued in the step 402. The rollback processing can restore one of the X blocks to its old or prior content as prior to issuing the reversible write in the step 402 which updated the block. The old or prior content of a block B stored at an SSD physical address mapped to an SSD logical address can be rolled back or restored by issuing a Read Old command. The Read Old command can read the old or prior content of the SSD logical address as prior to issuing the reversible write command in the step S2. Subsequently, a write command can be issued that restores or writes the old or prior content to the SSD logical address.

In at least one embodiment implementing the second retention policy described above with explicit reclamation, transactional update processing can include issuing reversible writes for all X pages or blocks to be updated for the transaction. Once all X pages have been successfully updated for the transaction, processing can then subsequently issue a reclaim old command for each of the X pages or blocks updated.

Figure 7:
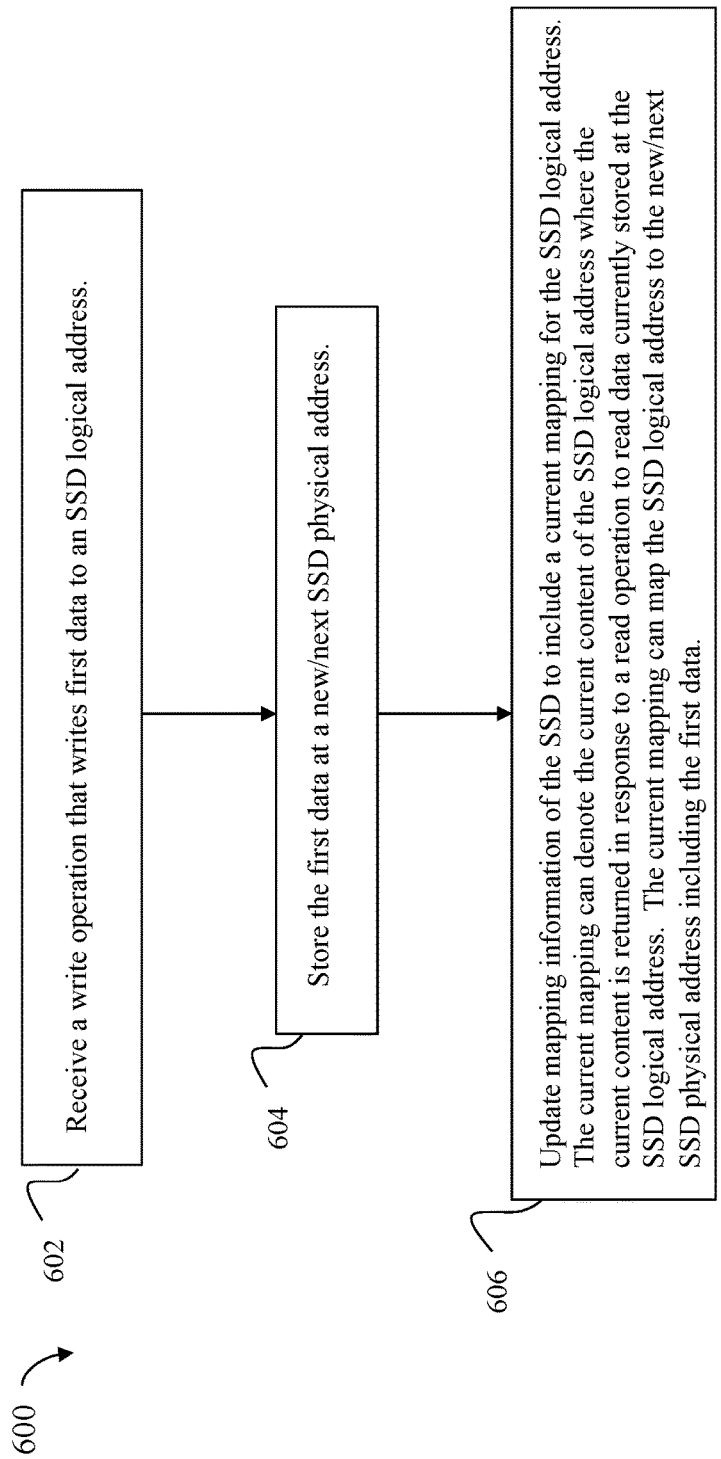

Referring to FIG. 7, shown is a flowchart 600 of processing steps that can be performed by an SSD in connection with servicing a normal or regular write in at least one embodiment in accordance with the techniques of the present disclosure.

At the step 602, a write operation can be received by an SSD that writes first data to an SSD logical address. Generally, the write operation can be issued by a client of the SSD. In at least one embodiment, the client can be the data storage system and, in particular, code executing on the data storage system that servicing a data storage system client write operation such as from a host. From the step 602, control proceeds to the step 604.

At the step 604, the SSD stores the first data at a new or next SSD physical address. From the step 604, control proceeds to the step 606.

At the step 606, processing can be performed to update mapping information of the SSD to include a current mapping for the SSD logical address. The current mapping can denote the current content of the SSD logical address, where the current content is returned in response to a read operation to read data currently stored at the SSD logical address. The current mapping can map the SSD logical address to the new/next SSD physical address including the first data.

Figure 8:
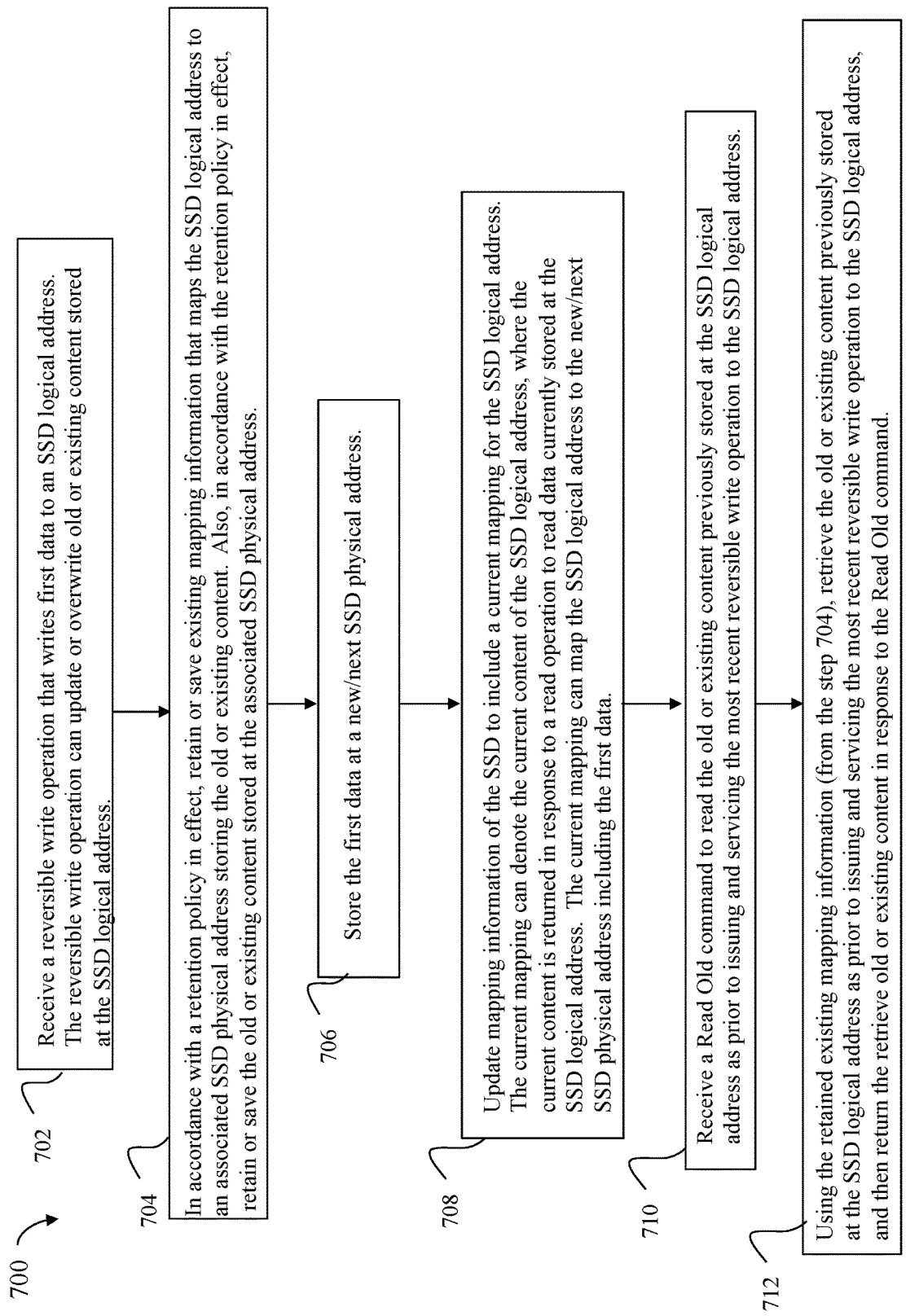

Referring to FIG. 8, shown is a flowchart 700 of processing steps that can be performed by an SSD in connection with servicing a reversible write operation or command and a subsequent Read Old operation or command in at least one embodiment in accordance with the techniques of the present disclosure.

At the step 702, the SSD can receive a reversible write operation or command that writes first data to an SSD logical address. The reversible write operation can update or overwrite old or existing content stored at the SSD logical address. Generally, the reversible write operation can be issued by a client of the SSD. In at least one embodiment, the client can be the data storage system and, in particular, code executing on the data storage system such as in connection with transactional update processing. From the step 702, control proceeds to the step 704.

At the step 704, in accordance with a retention policy in effect, processing can be performed to retain or save existing mapping information that maps the SSD logical address to an associated SSD physical address storing the old or existing content. Also, in accordance with the retention policy in effect, processing can be performed to retain or save the old or existing content stored at the associated SSD physical address. From the step 704, control proceeds to the step 706.

At the step 706, processing can be performed to store the first data at a new/next SSD physical address. From the step 706, control proceeds to the step 708.

At the step 708, processing can be performed to update mapping information of the SSD to include a current mapping for the SSD logical address. The current mapping can denote the current content of the SSD logical address, where the current content can be subsequently returned in response to a read operation to read data currently stored at the SSD logical address. The current mapping can map the SSD logical address to the new/next SSD physical address including the first data. From the step 708, control proceeds to the step 710.

At the step 710, the SSD can receive a Read Old command to read the old or existing content previously stored at the SSD logical address as prior to issuing and servicing the most recent reversible write operation to the SSD logical address. In this example with FIG. 8 processing, the most recent reversible write operation to the SSD logical address can be the reversible write operation received in the step 702. From the step 710, control proceeds to the step 712.

At the step 712, using the retained existing mapping information (from the step 704), processing can be performed to retrieve the old or existing content previously stored at the SSD logical address as prior to issuing and servicing the most recent reversible write operation to the SSD logical address, and then return the retrieve old or existing content in response to the Read Old command.

Generally, SSDs can have varying block sizes. For example, the block size can be specified for an SSD when formatting the SSD where the specified block size can be one of multiple supported block sizes. The block size can denote the internal SSD block size. The commands, such as the read, read old, write and reversible write commands, issued to a particular SSD can have logical addresses, sizes and other parameters based on the SSD internal block size of the particular SSD. Also, the value of "N" for the first retention policy discussed above denotes N blocks each having a size of the SSD internal block size. For simplicity of illustration, the description herein assumes that the client system, such as the data storage system issuing commands to the SSD has a same block size as the SSD internal block size. However, if the client system, such as the data storage system, uses a different block size, the client can perform any needed size conversions to utilize the SSD internal block size when issuing commands and performing other processing in an embodiment in accordance with the techniques of the present disclosure.

It should be noted that the particular SSD command syntax and semantics presented herein is exemplary and for illustration purposes only. More generally, any suitable command syntax and semantics can be used. For example, the reversible write command can be issued as a separate and distinct command from a write command denoting normal or regular write processing. As a variation, a single write API or command can be specified with a parameter denoting whether a particular write command instance denotes a reversible write or normal write processing. In at least one embodiment, the general write command syntax can include a "reversible" parameter or value indicating whether the write command instance is reversible or normal write processing. For example, the write command syntax can be:

Write (SSD, LBA1, "DATA WRITTEN", reversible=YES, . . . )

where
SSD identifies the particular SSD written to;
LBA1 denotes the SSD logical address written to;
"DATA WRITTEN" denotes the data written to the SSD logical address LBA1; and
reversible has a value of YES if the write command instance denotes a reversible write, and otherwise has a value of NO denoting that the write command instance denotes a normal or non-reversible write.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving, at a physical storage device, a first reversible write operation that writes first data to a first logical address on the physical storage device;
responsive to receiving the first reversible write operation, the physical storage device servicing the first reversible write operation, wherein the first reversible write operation updates first prior content stored at the first logical address prior to said servicing the first reversible write operation to the first data written by the first reversible write operation, wherein the first prior content is stored at a first physical address of the physical storage device, and wherein first mapping information of the physical storage device indicates that the first logical address is mapped to the first physical address, wherein said servicing the first reversible write operation includes:
retaining the first mapping information and the first prior content stored at the first physical address;
storing the first data at a second physical address of the physical storage device; and
adding second mapping information of the physical storage device to indicate that the first logical address is mapped to the second physical address of the physical storage device;
receiving, at the physical storage device, a read operation that requests to read the first prior content which is updated by said first reversible write operation and which is stored at the first logical address prior to said servicing the first reversible write operation; and
responsive to receiving the read operation, the physical storage device servicing the read operation, wherein said servicing the read operation includes:
the physical storage device using the first mapping information, that maps the first logical address to the first physical address, to read the first prior content from the first physical address of the physical storage device; and
returning the first prior content.

2. The computer-implemented method of claim 1, wherein a system is configured for communication with the physical storage device, the system issues the first reversible write operation and receives the first prior content, and wherein the method further comprises:
responsive to the system receiving the first prior content of the first logical address, the system issuing a second write operation to the physical storage device, wherein the second write operation writes the first prior content to the first logical address.

3. The computer-implemented method of claim 2, wherein said second write operation is received by the physical storage device, and the method further comprises:
the physical storage device servicing the second write operation to update the first logical address to store the first prior content.

4. The computer-implemented method of claim 2, wherein said servicing the second write operation by the physical storage device further includes:
storing the first prior content at a third physical address of the physical storage device; and
adding third mapping information of the physical storage device to indicate that the first logical address is mapped to the third physical address of the physical storage device.

5. The computer-implemented method of claim 4, wherein said physical storage device retains the first mapping information and the first prior content stored at the first physical address in accordance with a retention policy, and wherein the first mapping information denotes that the first prior content is stored at the first logical address at a point in time prior to servicing the first reversible write operation.

6. The computer-implemented method of claim 5, wherein the retention policy indicates that the physical storage device retains prior content for N logical addresses of the physical storage device that are updated using reversible write operations.

7. The computer-implemented method of claim 6, wherein the physical storage device maintains mapping information for the N logical addresses, wherein, for each of the N logical addresses, the mapping information maps said each logical address to a corresponding physical address including the prior content stored at said each logical address prior to issuing a corresponding reversible write operation that updates said each logical address.

8. The computer-implemented method of claim 7, wherein the N logical addresses denote the N most recently updated logical addresses each updated using a reversible write operation which preserves the prior content of said each logical address in accordance with the retention policy.

9. The computer-implemented method of claim 8, wherein the system is a data storage system which issues the first reversible write operation, the read operation, and the second write operation to the physical storage device.

10. The computer-implemented method of claim 9, further comprising performing transactional update processing by first code of the data storage system, wherein a first transaction includes atomically updating a plurality of logical addresses of the physical storage device, and wherein said transactional update processing includes:
issuing, from the data storage system to the physical storage device, a plurality of reversible write operations that update the plurality of logical addresses of the physical storage device; and
the physical storage device servicing the plurality of reversible write operations that update the plurality of logical addresses of the physical storage device, wherein said servicing the plurality of reversible write operations further includes performing, for each of the plurality of reversible write operations that updates one of the plurality of logical addresses to updated content processing comprising:
the physical storage device retaining existing content of said one logical address and associated mapping information that maps said one logical address to a corresponding physical address of the physical storage device that stores the existing content;
the physical storage device storing the updated content written by said each reversible write operation at an associated physical address of the physical storage device; and
the physical storage device updating current mapping information that maps said one logical address to the associated physical address.

11. The computer-implemented method of claim 10, wherein a failure occurs prior to completing said servicing the plurality of reversible write operations, and wherein said failure triggers rollback processing of said transactional update processing, said rollback processing comprising:
the data storage system issuing a second read operation to the physical storage device that reads the existing content of an associated one of the plurality of logical addresses using the associated mapping information that is retained and maps said associated one logical address to the existing content stored at the corresponding physical address of the physical storage device; and
the data storage system issuing another write operation to the physical storage device that writes the existing content to the associated one logical address to thereby update content stored at the associated one logical address, wherein writing the existing content to the associated one logical address includes storing the existing content at a new physical address of the physical storage device and updating the current mapping information that maps the associated one of the plurality of logical addresses to the new physical address.

12. The computer-implemented method of claim 5, wherein the retention policy indicates that the physical storage device retains, for a specified amount of time, prior content of logical addresses of the physical storage device that are updated using reversible write operations.

13. The computer-implemented method of claim 5, wherein the retention policy indicates that the storage device retains prior content of logical addresses of the physical storage device that are updated using reversible write operations until explicitly reclaimed.

14. The computer-implemented method of claim 13, wherein associated prior content of a specified one of the logical addresses of the physical storage device updated using a reversible write operation is reclaimed responsive to the physical storage device receiving a command that reclaims the associated prior content of the specified one logical address of the physical storage device.

15. The computer-implemented method of claim 14, further comprising:
receiving the command that reclaims the associated prior content of the specified one logical address of the physical storage device; and
responsive to receiving the command, the physical storage device reclaiming the associated prior content of the specified one logical address of the physical storage device, said reclaiming including reclaiming physical storage storing the associated prior content and reclaiming physical storage of retained mapping information that maps the specified one logical address to the reclaimed physical storage storing the associated prior content.

16. A physical storage device comprising:
one or more processors; and
a memory comprising code stored thereon that, when executed, performs a method comprising:
receiving, at the physical storage device, a first reversible write operation that writes first data to a first logical address on the physical storage device;
responsive to receiving the first reversible write operation, the physical storage device servicing the first reversible write operation, wherein the first reversible write operation updates first prior content stored at the first logical address prior to said servicing the first reversible write operation to the first data written by the first reversible write operation, wherein the first prior content is stored at a first physical address of the physical storage device, and wherein first mapping information of the physical storage device indicates that the first logical address is mapped to the first physical address, wherein said servicing the first reversible write operation includes:
retaining the first mapping information and the first prior content stored at the first physical address;
storing the first data at a second physical address of the physical storage device; and
adding second mapping information of the physical storage device to indicate that the first logical address is mapped to the second physical address of the physical storage device;
receiving, at the physical storage device, a read operation that requests to read the first prior content which is updated by said first reversible write operation and which is stored at the first logical address prior to said servicing the first reversible write operation; and
responsive to receiving the read operation, the physical storage device servicing the read operation, wherein said servicing the read operation includes:
the physical storage device using the first mapping information, that maps the first logical address to the first physical address, to read the first prior content from the first physical address of the physical storage device; and
returning the first prior content.

17. A non-transitory computer readable medium comprising code stored thereon that, when executed, performs a method comprising:
- receiving, at a physical storage device, a first reversible write operation that writes first data to a first logical address on the physical storage device;
- responsive to receiving the first reversible write operation, the physical storage device servicing the first reversible write operation, wherein the first reversible write operation updates first prior content stored at the first logical address prior to said servicing the first reversible write operation to the first data written by the first reversible write operation, wherein the first prior content is stored at a first physical address of the physical storage device, and wherein first mapping information of the physical storage device indicates that the first logical address is mapped to the first physical address, wherein said servicing the first reversible write operation includes:
  - retaining the first mapping information and the first prior content stored at the first physical address;
  - storing the first data at a second physical address of the physical storage device; and
  - adding second mapping information of the physical storage device to indicate that the first logical address is mapped to the second physical address of the physical storage device;
- receiving, at the physical storage device, a read operation that requests to read the first prior content which is updated by said first reversible write operation and which is stored at the first logical address prior to said servicing the first reversible write operation; and
- responsive to receiving the read operation, the physical storage device servicing the read operation, wherein said servicing the read operation includes:
  - the physical storage device using the first mapping information, that maps the first logical address to the first physical address, to read the first prior content from the first physical address of the physical storage device; and
  - returning the first prior content.

18. The computer readable medium of claim 17, wherein a system is configured for communication with the physical storage device, the system issues the first reversible write operation and receives the first prior content, and wherein the method further comprises:
- responsive to the system receiving the first prior content of the first logical address, the system issuing a second write operation to the physical storage device, wherein the second write operation writes the first prior content to the first logical address.

19. The computer readable medium of claim 18, wherein said second write operation is received by the physical storage device, and the method further comprises:
- the physical storage device servicing the second write operation to update the first logical address to store the first prior content.

20. The computer readable medium of claim 18, wherein said servicing the second write operation by the physical storage device further includes:
- storing the first prior content at a third physical address of the physical storage device; and
- adding third mapping information of the physical storage device to indicate that the first logical address is mapped to the third physical address of the physical storage device.

* * * * *